United States Patent
Asakawa et al.

(10) Patent No.: US 12,037,503 B2
(45) Date of Patent: Jul. 16, 2024

(54) INK JET INK COMPOSITION AND RECORDING METHOD

(71) Applicant: SEIKO EPSON CORPORATION, Tokyo (JP)

(72) Inventors: Yuta Asakawa, Azumino (JP); Mitsuaki Kosaka, Minowa (JP)

(73) Assignee: SEIKO EPSON CORPORATION (JP)

( * ) Notice: Subject to any disclaimer, the term of this patent is extended or adjusted under 35 U.S.C. 154(b) by 177 days.

(21) Appl. No.: 17/861,297

(22) Filed: Jul. 11, 2022

(65) Prior Publication Data

US 2023/0009453 A1  Jan. 12, 2023

(30) Foreign Application Priority Data

Jul. 12, 2021  (JP) .................................. 2021-114874

(51) Int. Cl.
  *C09D 11/36* (2014.01)
  *C09D 11/322* (2014.01)
  *C09D 11/38* (2014.01)

(52) U.S. Cl.
  CPC ............ *C09D 11/36* (2013.01); *C09D 11/322* (2013.01); *C09D 11/38* (2013.01)

(58) Field of Classification Search
  CPC ....... C09D 11/36; C09D 11/322; C09D 11/38; C09D 11/10; B41J 2/01; B41J 2/14201; B41J 11/0022; B41J 29/377; B41J 29/393
  See application file for complete search history.

(56) References Cited

U.S. PATENT DOCUMENTS

| | | |
|---|---|---|
| 2018/0236787 A1 | 8/2018 | Kagata et al. |
| 2018/0291217 A1 | 10/2018 | Kagata |
| 2019/0291471 A1 | 9/2019 | Ohta et al. |

FOREIGN PATENT DOCUMENTS

| | | | |
|---|---|---|---|
| CN | 108690399 A | 10/2018 | |
| CN | 110293781 A | 10/2019 | |
| EP | 3385341 A1 * | 10/2018 | ............ B41J 2/1652 |
| JP | 2013-144742 A | 7/2013 | |
| JP | 2018-134801 A | 8/2018 | |

OTHER PUBLICATIONS

Kagata Takayoshi, Aqueous Ink Jet Ink Composition, Ink Jet Recording Method, and Method for Controlling Ink Jet Recording Apparatus (EP 3 385 341 A1), [Abstract, 1.2 Aqueous Ink jet ink composition, 1.2.4 Organic solvent, 1.4 Recording Medium, 3.1 Preparation of ink composition, 3.2 reaction liquid] (Year: 2018).*

* cited by examiner

*Primary Examiner* — Lisa Solomon
(74) *Attorney, Agent, or Firm* — Harness, Dickey & Pierce, P.L.C.

(57) ABSTRACT

An ink jet ink composition is a water-based ink that contains at least one pigment and at least one resin and is for use in recording on a low- or non-absorbent recording medium. The ink composition contains at least one water-soluble low-molecular-weight organic compound that has a melting point of 30° C. or above and is any of an amide, sulfur-containing compound, or cyclic ether, and the low-molecular-weight organic compound constitutes 10% by mass or less of the total mass of the ink composition. The ink composition also contains at least one organic solvent that is a diol having a melting point of 25° C. or below, and the organic solvent constitutes a higher percentage than the low-molecular-weight organic compound.

14 Claims, 3 Drawing Sheets

# INK JET INK COMPOSITION AND RECORDING METHOD

The present application is based on, and claims priority from JP Application Serial Number 2021-114874, filed Jul. 12, 2021, the disclosure of which is hereby incorporated by reference herein in its entirety.

BACKGROUND

1. Technical Field

The present disclosure relates to an ink jet ink composition and a recording method.

2. Related Art

Ink jet recording is a known technology in which tiny droplets of an ink jet ink composition (hereinafter also referred to as "ink composition" or "ink") are ejected from nozzles of an ink jet head of an ink jet recording apparatus to record an image on a recording medium. In recent years, the technology has been used in image recording not only on recording media that absorb inks well, such as ordinary printing paper, but also on recording media that absorb limited volumes of inks, or low-absorbent recording media, such as art paper and low coat-weight paper, and on recording media that absorb little ink, or non-absorbent recording media, such as plastic films. Nowadays, water-based ink jet inks, in which water is the base material (hereinafter also referred to as "water-based inks") have found their use in image recording even on such low- or non-absorbent recording media.

Since water-based inks are weak in fixation and therefore tend to be inferior in abrasion resistance on low- or non-absorbent recording media, there is the technology of adding a nitrogen-containing solvent, such as 2-pyrrolidone, to ink (e.g., see JP-A-2018-134801). Such nitrogen-containing solvents contribute to improving abrasion resistance because they have resin solubility, the ability to make resins in inks and recording media swell and dissolve.

The often low abrasion resistance, however, is not the only disadvantage faced in recording on a low- or non-absorbent recording medium with a water-based ink. There is another: adjacent ones of the ink droplets (dots) landing on the recording medium combine when they touch each other, affecting image quality, because only little of the ink is absorbed by the recording medium (coalescence).

An attempt to improve both abrasion resistance and image quality (coalescence), furthermore, often results in an alteration of the ejection characteristics of the ink that will cause deviations of ink droplets from their intended landing points (deviation).

Overall, no one has succeeded in achieving high abrasion resistance, good image quality (coalescence), and great reduction of deviation at the same time in recording on a low- or non-absorbent recording medium with a water-based ink.

SUMMARY

A form of an ink jet ink composition according to an aspect of the present disclosure is a water-based ink that contains at least one pigment and at least one resin and is for use in recording on a low- or non-absorbent recording medium, wherein the ink composition contains at least one water-soluble low-molecular-weight organic compound that has a melting point of 30° C. or above and is any of an amide, sulfur-containing compound, or cyclic ether, the low-molecular-weight organic compound constituting 10% by mass or less of the total mass of the ink composition; and the ink composition contains at least one organic solvent that is a diol having a melting point of 25° C. or below, the organic solvent being more abundant than the low-molecular-weight organic compound.

A form of a recording method according to an aspect of the present disclosure includes ejecting an ink jet ink composition in the above form from an ink jet head and attaching the ink jet ink composition to a recording medium, wherein the recording medium is a low- or non-absorbent recording medium.

DESCRIPTION OF EXEMPLARY EMBODIMENTS

Figure 1:
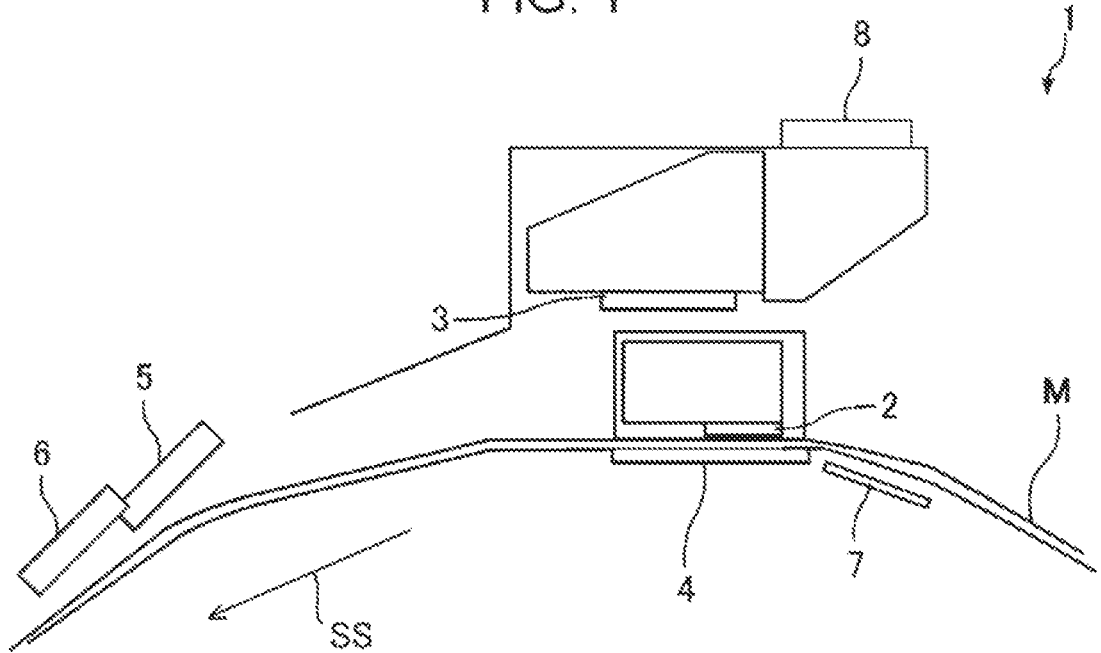
FIG. 1 is a schematic view of an example of an ink jet recording apparatus used in a recording method according to an embodiment.

The following describes embodiments of the present disclosure. The following embodiments are descriptions of examples of the disclosure. The disclosure is never limited to these embodiments and includes variations implemented within the gist of the disclosure. Not all the elements, features, or configurations described below are essential to the disclosure.

1. INK JET INK COMPOSITION

An ink jet ink composition according to an embodiment of an aspect of the present disclosure is a water-based ink that:

contains at least one pigment and at least one resin; and
is for use in recording on a low- or non-absorbent recording medium.

The ink composition contains at least one water-soluble low-molecular-weight organic compound that has a melting point of 30° C. or above and is any of an amide, sulfur-containing compound, or cyclic ether. The low-molecular-weight organic compound constitutes 10% by mass or less of the total mass of the ink composition.

The ink composition also contains at least one organic solvent that is a diol having a melting point of 25° C. or below. The organic solvent is more abundant than the low-molecular-weight organic compound.

The ink jet ink composition according to this embodiment helps achieve high abrasion resistance, good image quality (coalescence), and great reduction of deviation at the same time in recording on a low- or non-absorbent recording medium.

A disadvantage faced in recording on a low- or non-absorbent recording medium with a water-based ink is that adjacent ones of the ink droplets (dots) having landed on the recording medium combine when they touch each other, affecting image quality (coalescence), because only little of the ink is absorbed by the recording medium. A known technology for addressing such a disadvantage is to use a treatment liquid containing a flocculant that makes ink ingredients flocculate, but the use of a treatment liquid has its drawbacks, such as the recorded article being often inferior in, for example, abrasion resistance.

The inventors have found that by adding, to the ink, a water-soluble low-molecular-weight organic compound that has a melting point of 30° C. or above and is any of an amide, sulfur-containing compound, or cyclic ether (hereinafter also referred to as "specific low-molecular-weight organic compound"), image quality (coalescence) can be greatly improved even without using a treatment liquid. This, the inventors believe, is because adding a specific low-molecular-weight organic compound to the ink helps the ink thicken when drying, and the resulting restricted movement of dots helps fix the dots earlier, before they combine. That is, good image quality (coalescence) has been achieved not by the fixation of dots through reaction between a treatment liquid and the ink (pinning effect) but by the pinning effect of the ink itself containing particular ingredients. Specific low-molecular-weight organic compounds, furthermore, have resin solubility, the ability to make resins in inks and low- or non-absorbent recording media swell and dissolve. Adding a specific low-molecular-weight organic compound to the ink, therefore, helps achieve high abrasion resistance along with good image quality (coalescence).

Meanwhile, adding a specific low-molecular-weight organic compound to the ink has brought another disadvantage: deviations of ink droplets from their intended landing points. This, the inventors believe, is because an ink containing a specific low-molecular-weight organic compound tends to be variable in terms of ejection characteristics, often causing droplets of the ink to change their direction and velocity when or after being ejected from an ink jet head. An increase in viscosity associated with the drying of the ink, in particular, seems to be relevant to this.

After further extensive investigation, the inventors have found that by adding an organic solvent that is a diol having a melting point of 25° C. or below (hereinafter also referred to as "specific diol"), making it more abundant than the specific low-molecular-weight organic compound, and setting the percentage of the specific low-molecular-weight organic compound equal to or lower than a particular limit, great reduction of deviation can be achieved along with good image quality (coalescence) and high abrasion resistance.

The following describes ingredients in the ink jet ink composition according to this embodiment.

1.1 Pigment(s)

The ink jet ink composition according to this embodiment contains at least one pigment. Pigments that can be used include inorganic pigments, including carbon black and titanium white, and organic pigments.

Inorganic pigments that can be used include carbon black (C.I. Pigment Black 7) pigments, such as furnace black, lamp black, acetylene black, and channel black, iron oxide, titanium oxide, zinc oxide, and silica.

Examples of carbon black pigments include Mitsubishi Chemical Corporation's No. 2300, 900, MCF88, No. 20B, No. 33, No. 40, No. 45, No. 52, MA7, MA8, MA100, and No. 2200B. Other examples include Degussa's Color Black FW1, FW2, FW2V, FW18, FW200, S150, S160, and S170, Printex 35, U, V, and 140U, and Special Black 6, 5, 4A, 4, and 250, Columbian Carbon's Conductex SC and Raven 1255, 5750, 5250, 5000, 3500, 1255, and 700, Cabot's REGAL 400R, 330R, and 660R, MOGUL L, MONARCH 700, 800, 880, 900, 1000, 1100, 1300, and 1400, and ELFTEX 12.

As for organic pigments, examples include quinacridone pigments, quinacridone quinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, isoindolinone pigments, azomethine pigments, and azo pigments.

Specific examples of organic pigments that can be used in the ink jet ink composition include the following.

Examples of cyan pigments include C.I. Pigment Blue 1, 2, 3, 15:3, 15:4, 15:34, 16, 22, and 60; and C.I. Vat Blue 4 and 60. Preferably, one or a mixture of two or more selected from the group consisting of C.I. Pigment Blue 15:3, 15:4, and 60, for example, is used.

Examples of magenta pigments include C.I. Pigment Red 5, 7, 12, 48 (Ca), 48 (Mn), 57 (Ca), 57:1, 112, 122, 123, 168, 184, and 202 and C.I. Pigment Violet 19. Preferably, one or a mixture of two or more selected from the group consisting of C.I. Pigment Red 122, 202, and 209 and C.I. Pigment Violet 19, for example, is used.

Examples of yellow pigments include C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, and 185. Preferably, one or a mixture of two or more selected from the group consisting of C.I. Pigment Yellow 74, 109, 110, 128, 138, 155, and 180, for example, is used.

Examples of orange pigments include C.I. Pigment Orange 36, 43, and mixtures thereof. Examples of green pigments include C.I. Pigment Green 7, 36, and mixtures thereof.

Glitter pigments may also be used, and any kind of glitter pigment can be used as long as it can glitter when attached to a medium. Examples include particles of one metal or an alloy of two or more metals selected from the group consisting of aluminum, silver, gold, platinum, nickel, chromium, tin, zinc, indium, titanium, and copper (also referred to as metallic pigments) and pearl pigments, which are pigments having a pearly gloss. Typical examples of pearl pigments include pearlized or interference pigments, such as titanium dioxide-coated mica, pearl essence, and bismuth oxychloride. Glitter pigments surface-treated to be less reactive with water may also be used.

White pigments may also be used, and examples include metal compounds, such as metal oxides, barium sulfate, and calcium carbonate. Examples of metal oxides include titanium dioxide, zinc oxide, silica, alumina, and magnesium oxide. Hollow particles may also be used as a white pigment.

Dispersed Pigment

Preferably, the pigment is present dispersed in the ink composition, or as a dispersed pigment. As used herein, the term dispersed pigment encompasses a liquid dispersion of pigment and a slurry of pigment (low-viscosity aqueous dispersion).

Examples of dispersed pigments include, but are not limited to, a self-dispersible pigment, a polymer-dispersed pigment, and a pigment coated with a polymer.

Self-Dispersible Pigment

A self-dispersible pigment is a pigment that requires no dispersant to be dispersed or dissolved in an aqueous medium. In this context, "requires no dispersant to be dispersed or dissolved in an aqueous medium" means despite the absence of a dispersant for it to be dispersed, the pigment is present stably in the aqueous medium owing to hydrophilic groups it has on its surface. With this sort of pigment, therefore, the ink tends to be superior in ejection stability because there is little foaming due to a decrease in foam breaking properties caused by a dispersant. This type of pigment, furthermore, is easy to handle, for example because it can be contained to a higher concentration by virtue of being free from a great increase in viscosity that would occur with a dispersant. It helps make the print density sufficiently high.

Preferably, the hydrophilic groups are of one or more types selected from the group consisting of —OM, —COOM, —CO—, —$SO_3M$, —$SO_2M$, —$SO_2NH_2$, —$RSO_2M$, —$PO_3MH$, —$PO_3M_2$, —$SO_2NHCOR$, —$NH_3$, and —$NR_3$.

In these chemical formulae, M represents a hydrogen atom, an alkali metal, ammonium, a substituted or unsubstituted phenyl group, or an organic ammonium, and R represents a C1 to C12 alkyl group or substituted or unsubstituted naphthyl group. Multiple Ms or Rs are selected independently of one another.

A self-dispersible pigment is produced by, for example, coupling (grafting) such hydrophilic groups to the surface of a pigment by physically or chemically treating the pigment. Examples of physical treatments include plasma treatment in a vacuum. Examples of chemical treatments include wet oxidation, which is to oxidize the pigment with an oxidant in water, and coupling carboxylic groups to the surface of the pigment with phenyl groups therebetween by binding p-aminobenzoic acid to the surface.

Polymer-Dispersed Pigment

A polymer-dispersed pigment is a pigment that has been rendered dispersible through the dispersion of a polymer. Examples of preferred polymers for use in making a polymer-dispersible pigment include, but are not limited to, those having a glass transition temperature (Tg) of 80° C. or below, and those having a Tg of 70° C. or below are more preferred. When the Tg of the dispersant polymer, or the polymer used to disperse the pigment, is 80° C. or below, the fixation of the ink can be good.

Preferably, the weight-average molecular weight of the polymer in gel permeation chromatography (GPC) is 10,000 or more and 200,000 or less. This can make the storage stability of the ink even better. A weight-average molecular weight (Mw) herein can be measured as a polystyrene-equivalent weight-average molecular weight by gel permeation chromatography (GPC) with Hitachi, Ltd.'s L7100 system.

Preferably, 70% by mass or more of the polymer is that produced by the copolymerization of a (meth)acrylate and a (meth)acrylic acid because in that case the ink tends to be better in fixation and gloss. Preferably, the polymer is one polymerized from monomer species of which 70% by mass or more is at least one of a C1 to C24 alkyl (meth)acrylate or a C3 to C24 cyclic alkyl (meth)acrylate. Specific examples of such monomer species include, but are not limited to, methyl (meth)acrylate, ethyl (meth)acrylate, propyl (meth)acrylate, n-butyl (meth)acrylate, isobutyl (meth)acrylate, pentyl (meth)acrylate, hexyl (meth)acrylate, 2-ethylhexyl (meth)acrylate, octyl (meth)acrylate, nonyl (meth)acrylate, decyl (meth)acrylate, t-butylcyclohexyl (meth)acrylate, lauryl (meth)acrylate, isobornyl (meth)acrylate, cetyl (meth)acrylate, stearyl (meth)acrylate, isostearyl (meth)acrylate, tetramethylpyperidyl (meth)acrylate, dicyclopentanyl (meth)acrylate, dicyclopentenyl (meth)acrylate, dicyclopentenyloxy (meth)acrylate, and behenyl (meth) acrylate. Other monomer species can also be used in the polymerization, including hydroxyethyl (meth)acrylate, hydroxypropyl (meth)acrylate, diethylene glycol (meth) acrylate, and other hydroxy (i.e., hydroxyl-containing) (meth)acrylates, urethane (meth)acrylates, and epoxy (meth) acrylates.

As used herein, the expression (meth)acrylic refers to at least one of acrylic or methacrylic. The expression (meth) acrylate refers to at least one of an acrylate or methacrylate.

Pigment Coated with a Polymer

Of polymer-dispersed pigments, pigments coated with a polymer, or microencapsulated pigments, are particularly preferred because they tend to be superior in the fixation, gloss, and color reproduction of the resulting ink.

A pigment coated with a polymer is obtained by phase inversion emulsification. That is, a polymer as described above is dissolved in an organic solvent, such as methanol, ethanol, isopropanol, n-butanol, acetone, methyl ethyl ketone (MEK), or dibutyl ether. The resulting solution is combined with the pigment, and the resulting mixture is kneaded and dispersed with a neutralizing agent and water to give an oil-in-water dispersion. By removing the organic solvent from the resulting dispersion, a pigment coated with the polymer can be obtained as a dispersion in water. The kneading and dispersion can be performed using, for example, a ball mill, roll mill, bead mill, high-pressure homogenizer, or high-speed stirring disperser.

Preferably, the neutralizing agent is, for example, ethyl amine, trimethyl amine or any other tertiary amine, lithium hydroxide, sodium hydroxide, potassium hydroxide, or ammonia. Preferably, the pH of the resulting dispersion in water is from 6 to 10.

Preferably, the polymer for coating the pigment with is one having a weight-average molecular weight of about 10,000 to 150,000 in GPC as this helps ensure stable dispersion of the pigment.

One pigment may be used alone, or two or more may be used in combination.

Preferably, the average diameter on a volume basis (D50) (hereinafter also referred to as volume-average diameter) of particles of the pigment is from 50 to 400 nm, more preferably from 50 to 300 nm, even more preferably from 75 to 200 nm, in particular from 100 to 150 nm, especially from 100 to 120 nm. The volume-average diameter of particles can be measured using an instrument for measuring the size distribution of particles whose measuring principle is dynamic light scattering. The measuring instrument can be, for example, a particle size distribution analyzer whose measuring principle is dynamic light scattering (e.g., "Nanotrac Wave II EX-150," MicrotracBEL Corporation).

The pigment content can be adjusted according to the purpose of use. Preferably, the pigment content is, on a solids basis, 0.1% by mass or more and 20.0% by mass or less, more preferably 0.2% by mass or more and 15.0% by mass or less, even more preferably 1.0% by mass or more and 10.0% by mass or less of the total mass of the ink composition.

1.2 Resin(s)

The ink jet ink composition according to this embodiment contains at least one resin. The resin may be water-soluble or may be water-insoluble. The resin, furthermore, may be present either dissolved in the ink composition or dispersed in the ink composition. When used in the dissolved state, the resin can be polymer(s) as described above in relation to the dispersion of pigment in making a polymer-dispersed pigment. When used in the dispersed state, the resin can be resin(s) sparingly soluble or insoluble in the liquid medium in the ink composition contained in the form of dispersed resin particles (i.e., in an emulsion or suspension state). Because resins in the form of resin particles are preferred, it is preferred that the resin include resin particles. More preferably, the resin is resin particles. Such resin particles have the function of what is called a fixing resin, or the function to improve the adhesion and abrasion resistance of ingredients in an ink composition attached to a recording medium. When the resin includes resin particles, therefore, abrasion resistance is further improved. Adding a resin to the ink is advantageous in that it leads to high abrasion resistance; after the ink is attached to a recording medium, the specific low-molecular-weight organic compound, described below, dissolves the resin, encouraging the adhesion of the resin to the recording medium.

Examples of resin particles include particles of, for instance, urethane resins, acrylic resins, ester resins, fluorene resins, polyolefin resins, rosin-modified resins, terpene resins, polyester resins, polyamide resins, epoxy resins, vinyl chloride resins, and ethylene vinyl acetate resins. Particles of these resins are usually handled in emulsion form, but resin particles in powder form may also be used. One kind of resin particles alone or two or more in combination can be used.

Urethane resin is a generic term for resins that have a urethane bond. Urethane resins also include those containing a non-urethane bond, such as polyether urethane resins, which contain an ether bond in their backbone; polyester urethane resins, which contain an ester bond in their backbone; and polycarbonate urethane resins, which contain a carbonate bond in their backbone. Commercially available urethane resins may also be used. For example, one or more may be selected from commercially available urethane resins such as SUPERFLEX 210, 460, 460s, 840, and E-4000 (trade names, DKS Co., Ltd.), RESAMINE D-1060, D-2020, D-4080, D-4200, D-6300, and D-6455 (trade names, Dainichiseika Color & Chemicals Mfg. Co., Ltd.), Takelac WS-6020, WS-6021, and W-512-A-6 (trade names, Mitsui Chemicals Polyurethanes, Inc.), Sancure 2710 (trade name, LUBRIZOL), and PERMARIN UA-150 (trade name, Sanyo Chemical Industries).

Acrylic resin is a generic term for polymers obtained by polymerizing at least an acrylic monomer, such as (meth) acrylic acid or a (meth)acrylate. Examples include resins made from acrylic monomers and copolymers of acrylic and other monomers. Examples of the latter include acryl-vinyl resins, which are copolymers of acrylic and vinyl monomers, such as copolymers of an acrylic monomer and styrene or any other vinyl monomer. Acrylamide and acrylonitrile, for example, are also acrylic monomers that can be used.

Commercially available resin emulsions made with an acrylic resin may also be used. For example, one or more may be selected from products such as FK-854, Mowinyl 952B and 718A (trade names, Japan Coating Resin), Nipol LX852 and LX874 (trade names, Zeon), POLYSOL AT860 (trade name, Showa Denko K.K.), and VONCOAT AN-1190S, YG-651, AC-501, AN-1170, and 4001 (trade names, DIC).

As can be seen from the foregoing, acrylic resins herein include styrene-acrylic resins. As used herein, the expression (meth)acrylic refers to at least one of acrylic or methacrylic.

Styrene-acrylic resins are copolymers made from the styrene monomer and an acrylic monomer. Examples include styrene-acrylic acid copolymers, styrene-methacrylic acid copolymers, and styrene-a-methylstyrene-acrylic acid copolymers. Commercially available styrene-acrylic resins may also be used. Examples include Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade names, BASF) and Mowinyl 966A and 975N (trade names, Japan Coating Resin).

Vinyl chloride resins include vinyl chloride-vinyl acetate copolymers. Examples of ester resins include polymers that contain an acrylate as a monomer, such as styrene-methacrylic acid-acrylate copolymers, styrene-a-methylstyrene-acrylic acid copolymers, and styrene-a-methylstyrene-acrylic acid-acrylate copolymers.

Polyolefin resins are ones that have ethylene, propylene, butylene, or any other olefin in their structural backbone, and suitable one(s) can be selected from known ones. Commercially available polyolefin resins can be used. For example, one or more may be selected from products such as ARROWBASE CB-1200 and CD-1200 (trade names, UNITIKA Ltd.).

The resin particles may be supplied in emulsion form. Examples of commercially available variations of such resin emulsions include MICROGEL E-1002 and E-5002 (trade names, Nippon Paint, styrene-acrylic resin emulsions), VONCOAT AN-1190S, YG-651, AC-501, AN-1170, 4001, and 5454 (trade names, DIC, styrene-acrylic resin emulsions), POLYSOL AM-710, AM-920, AM-2300, AP-4735, AT-860, and PSASE-4210E (acrylic resin emulsions), POLYSOL AP-7020 (styrene-acrylic resin emulsion), POLYSOL SH-502 (vinyl acetate resin emulsion), POLYSOL AD-13, AD-2, AD-10, AD-96, AD-17, and AD-70 (ethylene-vinyl acetate resin emulsions), POLYSOL PSASE-6010 (ethylene-vinyl acetate resin emulsion) (trade names, Showa Denko), POLYSOL SAE1014 (trade name, Zeon, a styrene-acrylic resin emulsion), SAIVINOL SK-200 (trade name, Saiden Chemical Industry, an acrylic resin emulsion), AE-120A (trade name, JSR, an acrylic resin emulsion), AE373D (trade name, Emulsion Technology, a carboxy-modified styrene-acrylic resin emulsion), SEIKA-DYNE 1900W (trade name, Dainichiseika Color & Chemicals Mfg., an ethylene-vinyl acetate resin emulsion), VINYBLAN 2682 (acrylic resin emulsion), VINYBLAN 2886 (vinyl acetate-acrylic resin emulsion), VINYBLAN 5202 (acetic acid-acrylic resin emulsion) (trade names, Nissin Chemical Industry), VINYBLAN 700 and 2586 (trade names, Nissin Chemical Industry), elitel KA-5071S, KT-8803, KT-9204, KT-8701, KT-8904, and KT-0507 (trade names, Unitika, polyester resin emulsions), Hytec SN-2002 (trade name, Toho Chemical, a polyester resin emulsion), Takelac W-6020, W-635, W-6061, W-605, W-635, and W-6021 (trade names, Mitsui Chemicals Polyurethanes, urethane resin emulsions), SUPERFLEX 870, 800, 150, 420, 460, 470, 610, 620, and 700 (trade names, DKS, urethane resin emulsions), PERMARIN UA-150 (trade name, Sanyo Chemical Industries, Ltd., a urethane resin emulsion), Sancure 2710 (trade name, Lubrizol Japan, a urethane resin emulsion), NeoRez R-9660, R-9637, and R-940 (trade names, Kusumoto Chemicals Ltd., urethane resin emulsions), ADEKA BONTIGHTER HUX-380 and 290K (trade names, ADEKA Corporation, urethane resin emulsions), Mowinyl 966A and Mowinyl 7320 (trade names, Japan Coating Resin), Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (trade names, BASF), NK Binder R-5HN (trade name, Shin-Nakamura Chemical Co., Ltd.), HYDRAN WLS-210 (trade name, DIC Corporation, a non-crosslinked polyurethane), and Joncryl 7610 (trade name, BASF).

More preferably, the resin particles are those of resin(s) selected from urethane, acrylic, ester, and vinyl chloride resins as this leads to stronger adhesion and higher abrasion resistance. Preferably, the resin particles include those of acrylic resin(s) because this helps further improve the adhesion and abrasion resistance of ingredients in the water-based ink composition attached to a recording medium.

The resin particles may be composite fine particles of resins having a phase-separated structure formed by separate first- and second-resin phases (portions).

A form of composite fine particles of resins is that in which a first resin forms part of the fine particles while a second resin forms the rest. Examples include core-shell composite fine particles of resins, which have a core-shell structure in which one of a first or second resin primarily forms the outside (shell) of the fine particles while the other primarily forms the center (core); and sea-island composite fine particles of resins, in which one of a first or second resin forms the "sea" while the other forms islet portions therein.

Sea-island composite fine particles of resins may have exposed portions of the "island" resin on their outermost surface. The islands do not need to be distributed uniformly inside the composite fine particles; they may be localized. The islands may be spherical or nonspherical in shape and may vary in size, too. It is particularly preferred that the resin particles be sea-island composite fine particles of resins in which a first resin forms the sea while a second resin forms islands as this leads to higher stability in continuous ejection, higher abrasion resistance, etc.

The first resin as part of the composite fine particles of resins may be a homopolymer or may be a copolymer.

The first resin can be of any kind, but a possible option is an acrylic resin. Acrylic resins, having (meth)acrylic monomer unit(s), are advantageous in that their characteristics are easy to control and that they are readily available. Any kind of (meth)acrylic monomer units can be used, but examples include the same monomer species as described above in relation to making the polymer in a polymer-dispersed pigment.

The acrylic resin may be a resin having a (meth)acrylic monomer unit and an extra, non-(meth)acrylic monomer unit. This is advantageous because in that case it is easier to adjust characteristics of the resin. An example of an extra monomer unit is a vinyl monomer unit. Preferably, the acrylic resin has an aromatic monomer unit. Examples of aromatic monomer units include aromatic vinyl monomer and aromatic (meth)acrylic monomer units. Resins having an aromatic vinyl monomer unit are preferred.

The second resin can be one similar to but independent of the first resin. The second resin can be of any kind, but preferably is an acrylic resin, or a resin having a (meth)acrylic monomer unit, like the first resin.

It is not critical how to synthesize the composite fine particles of resins, but in an exemplary configuration, they can be synthesized by one, or optionally a combination of two or more, of known emulsion polymerization processes. Specific examples include batch polymerization, monomer feeding, pre-emulsion polymerization, seeded emulsion polymerization, multi-stage emulsion polymerization (e.g., two-stage emulsion polymerization), and phase-inversion emulsion polymerization. For how to produce sea-island or core-shell fine particles of resins, the reader can refer to, for example, *Colloids and Surfaces A: Physicochemical and Engineering Aspects,* 153 (1999), 255-270.

One resin may be used alone, or two or more may be used in combination.

When the resin in the ink jet ink composition according to this embodiment includes resin particles, it is preferred that the resin particles have a glass transition point of 50° C. to 110° C. Preferably, the volume-average diameter of the resin particles is from 90 to 220 nm.

For the lower limit on the glass transition point (Tg) of the resin particles, it is more preferred that the Tg be 60° C. or above, even more preferably 70° C. or above, in particular 80° C. or above. As for the upper limit, it is more preferred that the Tg be 105° C. or below, even more preferably 100° C. or below, in particular 95° C. or below.

For the lower limit on the volume-average diameter of the resin particles, it is more preferred that the volume-average diameter be 100 nm or more, even more preferably 110 nm or more, in particular 120 nm or more, especially 130 nm or more. As for the upper limit, it is more preferred that the volume-average diameter be 200 nm or less, even more preferably 180 nm or less, in particular 160 nm or less, especially 150 nm or less.

When resin particles therein have a glass-transition point and a volume-average diameter in any of these ranges, the ink tends to be superior in abrasion resistance and recovery from clogging in a balanced manner.

The glass transition point (Tg) can be checked by measuring it, for example by differential scanning calorimetry (DSC).

Preferably, the resin in the ink jet ink composition according to this embodiment is resin particles, with the ratio (B/A) of the volume-average diameter B of the resin particles to the volume-average diameter A of particles of the pigment being from 0.6 to 1.8. More preferably, the ratio B/A is from 0.8 to 1.6, even more preferably from 1.0 to 1.5, in particular from 1.2 to 1.4.

When the ratio (B/A) of the volume-average diameter B of resin particles therein and the volume-average diameter A of particles of the pigment is in any of these ranges, the ink tends to be superior in abrasion resistance and recovery from clogging in a balanced manner.

Preferably, the resin content is, on a solids basis, 0.5% by mass or more and 20.0% by mass or less, more preferably 1.0% by mass or more and 15.0% by mass or less, even more preferably 2.0% by mass or more and 10.0% by mass or less, in particular 3.0% by mass or more and 8.0% by mass or less of the total mass of the ink composition. 1.3 Water The ink jet ink composition according to this embodiment is a water-based ink and, therefore, contains water. As used herein, the term "water-based" in a "water-based" ink means the ink contains at least water as its primary solvent. Preferably, the water is of a type from which ionic impurities have been removed to the lowest possible levels, such as deionized water, ultrafiltered water, reverse osmosis water, distilled water, or any other type of purified or ultrapure water. The use of sterilized water, for example sterilized by ultraviolet irradiation or adding hydrogen peroxide, is advantageous because it helps control the development of molds and bacteria when the ink is stored long.

Preferably, the water content is 45% by mass or more, more preferably 50% by mass or more, even more preferably 60% by mass or more, in particular 70% by mass or more of the total mass of the ink composition. There is no upper limit, but preferably the water content is 98% by mass or less.

As for the organic solvent content of the ink composition, it is preferred that it be 40% by mass or less, more preferably 30% by mass or less, even more preferably 25% by mass or less, in particular 20% by mass or less of the total mass of the ink composition.

1.4 Specific Low-Molecular-Weight Organic Compound(s)

The ink jet ink composition according to this embodiment contains at least one water-soluble low-molecular-weight organic compound that has a melting point of 30° C. or above and is any of an amide, sulfur-containing compound, or cyclic ether (specific low-molecular-weight organic compound). The low-molecular-weight organic compound constitutes 10% by mass or less of the total mass of the ink composition.

The amides include any water-soluble low-molecular-weight organic compound having an amide structure. Examples of water-soluble low-molecular-weight organic compounds that have a melting point of 30° C. or above and are amides include cyclic amides, such as E-caprolactam (normal boiling point, 267° C.; melting point, 70° C.; molecular weight, 113), 2-piperidone (normal boiling point, 256° C.; melting point, 38° C.; molecular weight, 99), ω-heptalactam (normal boiling point, 288° C.; melting point, 36° C.; molecular weight, 127), succinimide (normal boiling point, 287° C.; melting point, 125° C.; molecular weight, 99), 5-methyl-2-pyrrolidone (normal boiling point, 248° C.; melting point, 38° C.; molecular weight, 99), and acyclic amides, such as acetoacetamide (normal boiling point, 271° C.; melting point, 52° C.; molecular weight, 101). Preferably, the amide is a cyclic amide because in that case the ink tends to be further improved in abrasion resistance and improved in recovery from clogging, too.

The sulfur-containing compounds include any water-soluble low-molecular-weight organic compound containing a sulfur atom in its molecule. Examples of water-soluble low-molecular-weight organic compounds that have a melting point of 30° C. or above and are sulfur-containing compounds include sulfones. Examples include dimethyl sulfone (normal boiling point, 248° C.; melting point, 110° C.; molecular weight, 94), diethyl sulfone (normal boiling point, 246° C.; melting point, 73° C.; molecular weight, 122), and ethyl methyl sulfone (normal boiling point, 245° C.; melting point, 34° C.; molecular weight, 108).

The cyclic ethers include any water-soluble low-molecular-weight organic compound having a cyclic ether structure. Examples of water-soluble low-molecular-weight organic compounds that have a melting point of 30° C. or above and are cyclic ethers include 1,4-dioxane-2,3-diol (normal boiling point, 259° C.; melting point, 114° C.; molecular weight, 120) and isosorbide (normal boiling point, 372° C.; melting point, 61° C.; molecular weight, 146).

Specific low-molecular-weight organic compounds are water-soluble compounds, and being water-soluble means, for example, when a 10% by mass mixture of the compound in water is stirred thoroughly at room temperature and then visually inspected, the liquid mixture neither contains visible undissolved residue nor looks turbid as a whole.

One specific low-molecular-weight organic compound may be used alone, or two or more may be used in combination.

Preferably, the molecular weight of the specific low-molecular-weight organic compound is 300 or less, more preferably from 30 to 250, even more preferably from 50 to 200, in particular from 70 to 150.

The melting point of the specific low-molecular-weight organic compound is not critical as long as it is 30° C. or above, but preferably is 40° C. or above, more preferably 50° C. or above, even more preferably 60° C. or above, in particular 70° C. or above. As for the upper limit, it is preferred that the melting point be 150° C. or below, more preferably 140° C. or below, even more preferably 130° C. or below, in particular 120° C. or below. More preferably, the melting point is 100° C. or below.

The melting point of the specific low-molecular-weight organic compound can be checked by measuring it, for example by differential scanning calorimetry (DSC).

Preferably, the specific low-molecular-weight organic compound has a normal boiling point of 280° C. or below, more preferably 270° C. or below, even more preferably 260° C. or below, in particular 250° C. or below. As for the lower limit, it is preferred that the normal boiling point of the specific low-molecular-weight organic compound be 200° C. or above, more preferably 210° C. or above, even more preferably 220° C. or above, in particular 230° C. or above. More preferably, the melting point is 250° C. or above, even more preferably 260° C. or above.

When the normal boiling point of the specific low-molecular-weight organic compound is in any of these ranges, the pinning effect produced when the ink thickens is advantageously combined with quick drying. As a result, the ink tends to be superior in image quality (coalescence) and abrasion resistance in a balanced manner.

The specific low-molecular-weight organic compound constitutes, for the upper limit, 10% by mass or less of the total mass of the ink composition. Preferably, the percentage is 9.0% by mass or less, more preferably 8.0% by mass or less, even more preferably 7.0% by mass or less, in particular 6.0% by mass or less, especially 5.0% by mass or less. As for the lower limit, it is preferred that the compound constitute 0.5% by mass or more, more preferably 1.0% by mass or more, even more preferably 1.5% by mass or more, in particular 2.0% by mass or more, especially 2.5% by mass or more, more specifically 3.0% by mass or more, above all 3.5% by mass or more of the total mass of the ink composition. When the percentage of the specific low-molecular-weight organic compound is in any of these ranges, the ink tends to be improved in image quality (coalescence and unevenness in gloss), deviation, etc., in a balanced manner.

1.5 Specific Diol(s)

The ink jet ink composition according to this embodiment contains at least one organic solvent that is a diol having a melting point of 25° C. or below (specific diol). The organic solvent is more abundant than the specific low-molecular-weight organic compound. The organic solvent is one that is a liquid at room temperature.

Preferably, the ratio by mass (A/B) between the quantity A of the organic solvent that is a diol having a melting point of 25° C. or below (specific diol) and the quantity B of the above low-molecular-weight organic compound (specific low-molecular-weight organic compound) is from 1.3 to 10, more preferably from 1.5 to 9.0, even more preferably from 2.0 to 5.0, in particular from 2.5 to 4.5.

When the ratio by mass (A/B) between the quantity A of the specific diol and the quantity B of the specific low-molecular-weight organic compound is in any of these ranges, the ink tends to be superior in deviation, abrasion resistance, recovery from clogging, etc., in a balanced manner.

Preferably, the organic solvent that is a diol having a melting point of 25° C. or below (specific diol) constitutes 5% to 30% by mass of the total mass of the ink composition. For the lower limit, it is more preferred that the percentage of the specific diol be 6% by mass or more, even more preferably 7% by mass or more, in particular 8% by mass or more, especially 9% by mass or more. As for the upper limit, it is more preferred that the percentage be 25% by mass or less, even more preferably 20% by mass or less, in particular 17% by mass or less, especially 14% by mass or less.

When the percentage of the specific diol is in any of these ranges, the ink tends to be superior in deviation, abrasion resistance, recovery from clogging, etc., in a balanced manner.

1.5.1 Types of Specific Diols

Diols are organic compounds having two hydroxy groups in their molecule. Diols include alkanediols, which are alkanes substituted with two hydroxy groups, and condensates produced by condensation between hydroxy groups of two or more molecules of an alkanediol.

Preferably, the specific diol has two to ten, more preferably three to eight, even more preferably three to six carbon atoms in its molecule.

Examples of organic solvents that are diols having a melting point of 25° C. or above (specific diols) include 1,2-alkanediols, such as ethylene glycol (also known as ethane-1,2-diol; melting point, −13° C.; normal boiling point, 197° C.), propylene glycol (also known as propane-1,2-diol; melting point, −59° C.; normal boiling point, 188° C.), 1,2-butanediol (melting point, −50° C.; normal boiling point, 192° C.), 1,2-pentanediol (melting point, −40° C.; normal boiling point, 209° C.), and 1,2-hexanediol (melting point, −40° C.; normal boiling point, 224° C.), and alkanediols like diethylene glycol (melting point, −8° C.; normal boiling point, 244° C.), dipropylene glycol (melting point, −39° C.; normal boiling point, 231° C.), triethylene glycol (melting point, −7° C.; normal boiling point, 287° C.), tripropylene glycol (melting point, −20° C.; normal boiling point, 270° C.), 1,3-propanediol (melting point, −27° C.; normal boiling point, 213° C.), 1,3-butanediol (also known as 1,3-butylene glycol; melting point, −77° C.; normal boiling point, 207° C.), 1,4-butanediol (melting point, 19° C.; normal boiling point, 235° C.), 2,3-butanediol (melting point, 20° C.; normal boiling point, 176° C.), 1,5-pentanediol (melting point, −16° C.; normal boiling point, 242° C.), 2-methyl-1,3-propanediol (melting point, −91° C.; normal boiling point, 214° C.), 3-methyl-1,3-butanediol (melting point, −25° C.; normal boiling point, 203° C.), 3-methyl-1,5-pentanediol (melting point, −10° C.; normal boiling point, 249° C.), 2-ethyl-1,3-hexanediol (melting point, −40° C.; normal boiling point, 243° C.), 3-methyl-1,5-pentanediol (melting point, −60° C.; normal boiling point, 150° C.), and 2-methylpentane-2,4-diol (melting point, −40° C.; normal boiling point, 197° C.).

Of specific diols, 1,2-alkanediols are particularly preferred. More preferably, the organic solvent is selected from ethylene glycol, propylene glycol, 1,2-butanediol, and 1,2-hexanediol.

One specific diol may be used alone, or two or more may be used in combination.

Preferably, the organic solvent that is a diol having a melting point of 25° C. or below (specific diol) includes an organic solvent having a normal boiling point of 170° C. to 250° C., more preferably an organic solvent having a normal boiling point of 190° C. to 240° C., even more preferably an organic solvent having a normal boiling point of 210° C. to 230° C. Alternatively, it is preferred that the normal boiling point be from 180° C. to 220° C., more preferably from 180° C. to 210° C., even more preferably from 180° C. to 200° C.

When the normal boiling point of the specific diol is in any of these ranges, the ink tends to be further improved in drying and better in abrasion resistance.

Preferably, the specific diol has a melting point of −100° C. to 25° C., more preferably −80° C. to 0° C., even more preferably −80° C. to −20° C.

1.5.2 Extra Low-Molecular-Weight Organic Compound(s)

The ink jet ink composition according to this embodiment may contain an extra low-molecular-weight organic compound that is not a specific low-molecular-weight organic compound or specific diol, both as described above. The extra low-molecular-weight organic compound may be, preferably is, an organic solvent.

Examples of such extra low-molecular-weight organic compounds include polyhydric alcohols, esters, cyclic esters, alkylene glycol ethers, and amides, sulfur-containing compounds, and cyclic ethers excluding the aforementioned specific low-molecular-weight organic compounds.

Polyhydric alcohols are compounds having two or more hydroxy groups in their molecule. It should be noted that the aforementioned specific diols are excluded here. Polyhydric alcohols include alkane polyols, which are alkanes substituted with two or more hydroxy groups, and condensates produced by condensation between hydroxy groups of two or more molecules of an alkane polyol.

Examples of polyhydric alcohols include diols that are not specific diols, such as 1,2-octanediol (melting point, 36° C.), 1,6-hexanediol (melting point, 43° C.), 2-ethyl-2-methyl-1,3-propanediol (melting point, 43° C.), 2-methyl-2-propyl-1,3-propanediol (melting point, 57° C.), 2,2-dimethyl-1,3-propanediol (melting point, 128° C.), and 2,3-dimethyl-2,3-butanediol (melting point, 43° C.), trimethylolpropane, and glycerol.

Examples of esters include glycol monoacetates, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate, and glycol diesters, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, diethylene glycol acetate butyrate, propylene glycol acetate propionate, propylene glycol acetate butyrate, dipropylene glycol acetate butyrate, and dipropylene glycol acetate propionate.

Examples of cyclic esters include cyclic esters (lactones) like β-propiolactone, γ-butyrolactone, δ-valerolactone, ε-caprolactone, β-butyrolactone, β-valerolactone, γ-valerolactone, β-hexanolactone, γ-hexanolactone, β-hexanolactone, β-heptanolactone, γ-heptanolactone, β-heptanolactone, ε-heptanolactone, γ-octanolactone, δ-octanolactone, ε-octanolactone, δ-nonalactone, ε-nonalactone, and ε-decanolactone and compounds derived from them by substituting hydrogen(s) in the methylene group next to the carbonyl group with a C1 to C4 alkyl group.

The alkylene glycol ethers include any monoether or diether of an alkylene glycol, and alkyl ethers are preferred. Specific examples include alkylene glycol monoalkyl ethers, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether, and alkylene glycol dialkyl ethers, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

Amides include, for example, acyclic amides and cyclic amides. Examples of acyclic amides include alkoxyalkylamides, such as 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-isopropoxy-N,N-dimethylpropionamide, 3-isopropoxy-N,N-diethylpropionamide, 3-isopropoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide, N,N-dimethylacetoacetamide, N,N-diethylacetoacetamide, N-methylacetoacetamide, N,N-dimethylisobutyramide, N,N-dimethylformamide, N,N-diethylformamide, N,N-dimethylacetamide, N,N-diethylacetamide, and N,N-dimethylpropionamide.

Examples of cyclic amides include lactams, including pyrrolidones, such as 2-pyrrolidone, 1-methyl-2-pyrrolidone, 1-ethyl-2-pyrrolidone, 1-propyl-2-pyrrolidone, and 1-butyl-2-pyrrolidone, N-methyl-ε-caprolactam, N-cyclohexyl-2-pyrrolidone, and δ-propiolactam.

Examples of sulfur-containing compounds include sulfoxides and sulfones. Sulfoxides include, for example, acyclic sulfoxides, such as dimethylsulfoxide and diethylsulfoxide, and cyclic sulfoxides, such as tetramethylene sulfoxide. Examples of sulfones include cyclic sulfones, such as 3-methylsulfolane and sulfolane, and acyclic sulfones, such as ethyl isopropyl sulfone.

Examples of cyclic ethers include tetrahydrofuran, 1,4-dioxane, dimethyl isosorbide, 3-methyl-3-oxetanemethanol, 3-ethyl-3-oxetanemethanol, 2-hydroxymethyloxetane, tetrahydrofurfuryl alcohol, glycerol formal, solketal, and dihydrolevoglucosenone.

One extra low-molecular-weight organic compound may be used alone, or two or more may be used in combination.

The ink according to this embodiment may contain organic solvents that are polyhydric alcohols having a normal boiling point higher than 280° C., but preferably with their percentage not exceeding 1% by mass, more preferably not exceeding 0.5% by mass. It is even more preferred that the ink contain no such organic solvent. In this context, organic solvents that are polyhydric alcohols having a normal boiling point higher than 280° C. include specific diols or extra low-molecular-weight organic compounds, both as described above, having a normal boiling point higher than 280° C. This is advantageous because in that case the ink is better in, for example, abrasion resistance.

It is also preferred that the percentage of organic solvents having a normal boiling point higher than 280° C. be in any of these ranges.

1.6 Wax(es)

The ink jet ink composition according to this embodiment may contain wax. Examples of waxes include waxes like vegetable/animal waxes, such as carnauba wax, candelilla wax, beeswax, rice bran wax, and lanolin; mineral waxes, such as montan wax and ozokerite; petroleum waxes, such as paraffin waxes; and synthetic waxes, such as carbon waxes, hoechst waxes, polyolefin waxes, silicone waxes, and stearic acid amide, natural/synthetic wax emulsions, such as α-olefin-maleic anhydride copolymers, and compound waxes. Such waxes have the function to improve the abrasion resistance of the recorded article by slicking its surface and, by virtue of this, are effective in improving the rub fastness of the recorded article, too. One or a mixture of multiple ones of such waxes can be used. Of these, silicone waxes, polyolefin waxes, and paraffin waxes, for example, are particularly suitable for use.

Examples of commercially available silicone waxes include SM8706EX, SM7036EX, SM7060EX, SM7025EX, SM490EX, SM8701EX, SM8709SR, SM8716SR, IE-7045, IE-7046T, SH7024, BY22-744EX, BY22-818EX, FZ-4658, FZ-4634EX, and FZ-4602 (trade names, Dow Corning Toray Co., Ltd.) and POLON-MF-14, POLON-MF-14EC, POLON-MF-23, POLON-MF-63, POLON-MF-18T, POLON-MF-56, POLON-MF-49, POLON-MF-33A, POLON-MF-55T, POLON-MF-28T, POLON-MF-50, POLON-MK-206, POLON-SR-CONC, KM-9771, KM-9774, KM-2002-T, KM-2002-L-1, KM-9772, KS-7002, KS-701, and X-51-1264 (trade names, Shin-Etsu Chemical Co., Ltd.).

Examples of polyolefin waxes include waxes produced from ethylene, propylene, butylene, or other olefins or from their derivatives and copolymers of such waxes, specifically polyethylene waxes, polypropylene waxes, and polybutylene waxes. One of a combination of two or more polyolefin waxes can be used. Of these, polyethylene waxes are particularly preferred.

Examples of commercially available polyolefin waxes include the AQUACER range, such as AQUACER 513 (polyethylene wax; average diameter of particles, 100 nm or more and 200 nm or less; melting point, 130° C.; solids content, 30%), AQUACER 507, AQUACER 515, AQUACER 840, and AQUACER 1547 (trade names, BYK Japan KK), the Hytec range, such as Hytec E-7025P, Hytec E-2213, Hytec E-6500, Hytec E-6314, Hytec E-9460, Hytec E-9015, Hytec E-4A, Hytec E-5403P, and Hytec E-8237 (trade names, Toho Chemical Industry, Co., Ltd., polyethylene waxes), and NOPCOTE PEM-17 (trade name; San Nopco; polyethylene emulsion; average diameter of particles, 40 nm).

Paraffin waxes are so-called petroleum waxes. In this context, the term paraffin refers to a C20 or longer alkane, and paraffin waxes in this embodiment represent mixtures of hydrocarbons with molecular weights of approximately 300 to 500 including a predominant C20 to C30 linear paraffin hydrocarbon and small amounts of isoparaffins.

Examples of commercially available paraffin waxes include AQUACER 537 and AQUACER 539 (trade names, BYK Japan KK).

Preferably, the wax content is, on a solids basis, 0.1% by mass or more and 10.0% by mass or less, more preferably 0.2% by mass or more and 5.0% by mass or less, even more preferably 0.5% by mass or more and 1.0% by mass or less of the total mass of the ink composition.

1.7 Defoamer

The ink jet ink composition according to this embodiment may contain a defoamer. Examples of defoamers include, but are not limited to, silicone defoamers, polyether defoamers, fatty acid ester defoamers, and acetylene glycol defoamers. Of these, silicone defoamers and acetylene glycol defoamers are particularly preferred because they perform well in keeping appropriate surface and interfacial tensions while foaming little. More preferably, the Griffin HLB of the defoamer is 6 or smaller.

As mentioned herein, the Griffin HLB is a measure of a compound's hydrophilicity proposed by Griffin and refers to a value calculated according to equation (1) below. The Griffin HLB ranges from 0 to 20, and the greater the number is, the more hydrophilic the compound is.

$$HLB = 20 \times (\% \text{ by mass of hydrophilic groups}) = 20 \times (\text{total formula weight of hydrophilic groups} / \text{molecular weight of the surfactant}) \quad (1)$$

Any kind of defoamer with an HLB of 6 or smaller can be used, but specific examples include Surfynol 104, 104E, 104H, 104A, 104BC, 104DPM, 104PA, 104PG-50, 1045, 420, DF-110D, and 82 (all are trade names; Air Products and Chemicals, Inc.) and BYK-011, BYK-012, BYK-017, BYK-018, BYK-019, BYK-020, BYK-021, BYK-022, BYK-023, BYK-024, BYK-025, BYK-028, BYK-038, BYK-044, BYK-080A, BYK-094, BYK-1610, BYK-1615, BYK-1650, BYK-1730, and BYK-1770 (all are trade names; BYK Japan KK).

Preferably, the defoamer content is 0.01% by mass or more and 1.00% by mass or less, more preferably 0.03% by mass or more and 0.50% by mass or less, even more preferably 0.05% by mass or more and 0.20% by mass or less of the total mass of the ink composition.

1.8 Surfactant

The ink jet ink composition according to this embodiment may contain a surfactant. (Those mentioned as examples of defoamers are excluded. That is, surfactants in this context only include those having a Griffin HLB of greater than 6.) Examples of surfactants include, but are not limited to, nonionic surfactants. Nonionic surfactants help ink spread on a recording medium uniformly. Ink jet recording with an ink containing a nonionic surfactant, therefore, gives high-definition images with little bleed. Examples of such nonionic surfactants include, but are not limited to, silicone, polyoxyethylene alkyl ether, polyoxypropylene alkyl ether, polycyclic phenyl ether, sorbitan derivative, and fluorine surfactants. Of these, silicone surfactants are particularly preferred.

Any kind of silicone surfactant can be used, but polysiloxane compounds are examples of preferred ones. Although any polysiloxane compound can be used, examples include polyether-modified organosiloxanes. Any commercially available polyether-modified organosiloxane can be used, but examples include BYK-306, BYK-307, BYK-333, BYK-341, BYK-345, BYK-346, BYK-348, BYK-349, BYK-3420, BYK-3480, and BYK-3481 (trade names, BYK), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names, Shin-Etsu Chemical Co., Ltd.), SAG002, SAG003, SAG502, SAG503A, SAG005, SAG008, SAG016, and SAG020 (all are trade names; Nissin Chemical Industry), TEGO WET 260, TEGO WET 270, TEGO WET 280, and TEGO WET KL245 (all are trade names; Evonik Japan), and DOWSIL 502W (trade name, Dow Toray Co., Ltd.).

Preferably, the surfactant content is 0.05% by mass or more and 5.00% by mass or less, more preferably 0.15% by mass or more and 2.50% by mass or less, even more preferably 0.10% by mass or more and 1.00% by mass or less of the total mass of the ink composition.

1.9 Alkanolamine

The ink jet ink composition according to this embodiment may contain an alkanolamine. An alkanolamine can improve image quality (coalescence) by enhancing the pinning effect because the manufacturer can adjust the pH of the ink composition with it and because the ink tends to be more viscous when containing it.

Examples of alkanolamines include monoethanolamine, diethanolamine, triethanolamine, N,N-dimethylethanolamine, N,N-diethylethanolamine, N,N-dibutylethanolamine, N-aminoethylethanolamine, N-methylethanolamine, N-ethylethanolamine, N-butylethanolamine, N-tert-butylethanolamine, N-methyldiethanolamine, N-ethyldiethanolamine, N-butyldiethanolamine, N-tert-butyldiethanolamine, 2-amino-1-propanol, 2-amino-2-methyl-1-propanol, 5-amino-1-pentanol, 2-amino-2-methyl-1,3-propanediol, 2-amino-2-hydroxymethyl-1,3-propanediol, 3-amino-1,2-propanediol, 3-methylamino-1,2-propanediol, propanolamine, N,N-dimethylpropanolamine, N,N-diethylpropanolamine, tripropanolamine, isopropanolamine, diisopropanolamine, triisopropanolamine, N,N-dimethylisopropanolamine, and N,N-diethylisopropanolamine.

Preferably, the alkanolamine content is 0.1% by mass or more and 10.0% by mass or less, more preferably 0.3% by mass or more and 5.0% by mass or less, even more preferably 0.5% by mass or more and 3.0% by mass or less of the total mass of the ink composition.

1.10 Extra Ingredients

Besides these, the ink jet ink composition according to this embodiment may optionally contain ingredients like preservatives/antimolds, antirusts, chelating agents, viscosity modifiers, antioxidants, and fungicides.

1.11 Preparation of the Ink Jet Ink Composition

The ink jet ink composition according to this embodiment is obtained by mixing the above ingredients in any order, optionally with subsequent removal of impurities, for example by filtration. A suitable method for mixing the ingredients is to add the materials one by one to a container equipped with a stirring device, such as a mechanical or magnetic stirrer, and mixing the materials together by stirring. The filtration can be done by performing centrifugal filtration, passing the mixture through a filter, etc., as necessary.

1.12 Characteristics of the Ink Jet Ink Composition

Preferably, the ink jet ink composition according to this embodiment has a surface tension at 20° C. of 18 mN/m or more and 40 mN/m or less for the balance between image quality and reliability for use as ink for ink jet recording. More preferably, the surface tension at 20° C. is 20 mN/m or more and 35 mN/m or less, even more preferably 22 mN/m or more and 33 mN/m or less. As for measurement, the surface tension can be measured by, for example, checking it on a platinum plate wet with the ink under 20° C.

conditions using CBVP-Z automated surface tensiometer (trade name, Kyowa Interface Science Co., Ltd.).

For the same reason, it is preferred that the viscosity at 20° C. of the ink jet ink composition according to this embodiment be 3 mPa·s or more and 10 mPa·s or less, more preferably 3 mPa·s or more and 8 mPa·s or less. As for measurement, the viscosity under 20° C. conditions can be measured using, for example, MCR-300 rheometer (trade name, Physica).

1.13 Applications of the Ink Jet Ink Composition

The ink jet ink composition according to this embodiment is for use in recording on a low- or non-absorbent recording medium.

Low- or non-absorbent recording media are recording media having a tendency to absorb no or little of liquids, including inks. Quantitatively, a low- or non-absorbent recording medium represents a recording medium that, in the Bristow test, absorbs 10 mL/m² or less water from the start of contact until 30 msec$^{1/2}$. This Bristow test is the most popular method for brief measurement of liquid absorption and has also been adopted by Japan Technical Association of the Pulp and Paper Industry, or JAPAN TAPPI.

The details of the test method are set forth in No. 51 of JAPAN TAPPI Test Method 2000, which specifies the Bristow test as a method for testing the absorption of liquid in paper and paperboards. Absorbent recording media, on the other hand, are recording media that are not non- or low-absorbent ones.

An example of a non-absorbent recording medium is one having a plastic recording side. On the surface of the recording side, there is no absorbing or receiving layer for taking in liquids. Examples include a combination of a substrate, such as a piece of paper, and a plastic coating thereon, a combination of a substrate, such as a piece of paper, and a plastic film joined thereto, and a plastic film having no absorbing or receiving layer. Examples of plastic materials in this context include polyvinyl chloride, polyethylene terephthalate, polycarbonate, polystyrene, polyurethane, polyethylene, and polypropylene.

An example of a low-absorbent recording medium is a recording medium having a coating layer on their surface, called coated paper. Examples of paper-based ones, for instance, include paper for commercial printing, such as art paper, low coat-weight paper, and matte-coated paper, and examples of plastic-based ones include films of polyvinyl chloride, polyethylene terephthalate, polycarbonate, polystyrene, polyurethane, polyethylene, polypropylene, etc., with a coating, for example of a hydrophilic polymer, on their surface and those having a coating of particles, for example of silica or titanium, with a binder therein.

The ink jet ink composition according to this embodiment is also suitable for use in recording on a flexible packaging film. Flexible packaging films are a form of the aforementioned non-absorbent recording media. In more specific terms, flexible packaging films are a film material with high flexibility for use in, for example, food, toiletry, and cosmetic packaging. The films retain an anti-fog and/or anti-static material, an antioxidant, etc., on their surface, and their thickness is from 5 to 70 m, preferably from 10 to 50 m. When one tries to attach, for example, an ink composition to this film, the ink composition does not fix well and bleeds easily compared with that on plastic films having an ordinary thickness. The recorded article, therefore, can be inferior in abrasion resistance and image quality (coalescence). The ink jet ink composition according to this embodiment, however, tends to deliver good abrasion resistance and image quality (coalescence) even on a flexible packaging film.

The material forming the recording side of the flexible packaging film can be one that contains at least one resin selected from olefin resins, such as polyethylene and polypropylene, ester resins, such as polyester, vinyl chloride resins, such as polyvinyl chloride, and amide resins, such as polyamide. The film substrate, including the recording side of the flexible packaging film, can be a film or sheet made from such resin(s). A film or sheet made with resin(s) can be of any type, such as a cast film or uniaxially or biaxially oriented film, and preferably is a biaxially oriented one. Optionally, films or sheets made from such resins may be joined together to form a multilayer substrate.

The ink jet ink composition according to this embodiment is suitable for use in recording on a recording medium for sign graphics, too. Although recording media for sign graphics are made with a wide variety of materials, from banners, low coat-weight paper, matte-coated paper, wallpaper, and cloth to PET, PVC, and other plastic films, the ink composition according to this embodiment is particularly suitable for use with transparent or translucent plastic films, for example for window display or car wrapping. Many of such films have a substrate formed by a flexible material, such as a polyolefin, PET, or PVC, and an adhesive layer on the side opposite the print side. The film is used by attaching it on its adhesive side, for example to a windowpane or the body of an automobile, after printing. When one tries to attach an ink composition to this film, the ink fixes less firmly and bleeds more easily. The recorded article, therefore, can be inferior in abrasion resistance and image quality (coalescence). The ink jet ink composition according to this embodiment, however, tends to deliver good abrasion resistance and image quality (coalescence) even on a recording medium for sign graphics.

The material forming the recording side of the film for sign graphics can be one that contains at least one resin selected from olefin resins, such as polyethylene and polypropylene, ester resins, such as polyester, vinyl chloride resins, such as polyvinyl chloride, and amide resins, such as polyamide.

In addition, the recording medium may be, for example, colorless and transparent, translucent, colored and transparent, colored and opaque, or colorless and opaque.

2. RECORDING METHOD

A recording method according to an embodiment of the present disclosure includes:

ejecting the above ink jet ink composition from an ink jet head and attaching it to a recording medium. The recording medium is a low- or non-absorbent recording medium.

The recording method according to this embodiment helps achieve high abrasion resistance, good image quality (coalescence), and great reduction of deviation at the same time in recording on a low- or non-absorbent recording medium.

A disadvantage faced in recording on a low- or non-absorbent recording medium with a water-based ink is that adjacent ones of the ink droplets (dots) having landed on the recording medium combine when they touch each other, affecting image quality (coalescence), because only little of the ink is absorbed by the recording medium. A known technology for addressing such a disadvantage is to use a treatment liquid containing a flocculant that makes ink ingredients flocculate, but the use of a treatment liquid has its drawbacks, such as the ink being often inferior in, for example, abrasion resistance. A first heating step, in which the ink attached to the recording medium is dried immediately by heating, can reduce the coalescence of dots, but heating can cause issues such as unevenness in gloss (gloss-banding irregularities), slow recovery from clogging, and increased water condensation at the ink jet head.

The inventors have found that by adding, to the ink used in the recording process, a water-soluble low-molecular-weight organic compound that has a melting point of 30° C. or above and is any of an amide, sulfur-containing compound, or cyclic ether (specific low-molecular-weight organic compound), image quality (coalescence) can be greatly improved even without using a treatment liquid. This, the inventors believe, is because adding a specific low-molecular-weight organic compound to the ink helps the ink thicken when drying, and the resulting restricted movement of dots helps fix the dots earlier, before they combine. That is, good image quality (coalescence) arose not from the fixation of dots through reaction between a treatment liquid and the ink (pinning effect) but from the pinning effect of the ink itself containing particular ingredients. Specific low-molecular-weight organic compounds, furthermore, have resin solubility, the ability to make resins in inks and low- or non-absorbent recording media swell and dissolve. Adding a specific low-molecular-weight organic compound to the ink, therefore, helps achieve high abrasion resistance along with good image quality (coalescence).

Meanwhile, adding a specific low-molecular-weight organic compound to the ink used in the recording process has brought another disadvantage: deviations of ink droplets from their intended landing points. This, the inventors believe, is because an ink containing a specific low-molecular-weight organic compound tends to be variable in terms of ejection characteristics, often causing droplets of the ink to change their direction and velocity when or after being ejected from an ink jet head. An increase in viscosity associated with the drying of the ink, in particular, seems to be relevant to this.

After further extensive investigation, the inventors have found that by adding an organic solvent that is a diol having a melting point of 25° C. or below (specific diol), making it more abundant than the specific low-molecular-weight organic compound, and setting the percentage of the specific low-molecular-weight organic compound equal to or lower than a particular limit, great reduction of deviation can be achieved along with good image quality (coalescence) and high abrasion resistance.

The following describes the recording method according to this embodiment in detail and an ink jet recording apparatus that can be used in the recording method.

2.1 Ink Attachment Step

The recording method according to this embodiment includes ejecting the above ink jet ink composition from an ink jet head and attaching it to a recording medium (ink attachment step). The recording medium is a low- or non-absorbent recording medium.

Examples of recording media that can be used are the same as described above in relation to the ink jet ink composition. The details are as described above.

The ink attachment step can be performed easily by, for example, using an ink jet recording apparatus 1 as illustrated in FIG. 1, described below, and making it eject the ink from its ink jet head 2. A composition that is used for recording by being ejected as ink from an ink jet head by ink jet technology is referred to as an ink jet ink composition.

Preferably, the ink jet ink composition loading is from 1 to 40 mg/inch$^2$, more preferably from 2 to 30 mg/inch$^2$, even more preferably from 4 to 20 mg/inch$^2$, in particular from 6 to 16 mg/inch$^2$, per unit area of the recording region of the recording medium. It is also preferred that the maximum ink loading, in the recording job, per unit area of the recording region of the recording medium be set in any of these ranges.

Preferably, the ink attachment step in the recording method according to this embodiment is one that includes repeating a main scan in which the relative positions of the recording medium and the ink jet head are changed while the above ink jet ink composition is ejected from the ink jet head. Preferably, ten or fewer main scans are made in the same main scan area. For the upper limit, it is more preferred that the number of main scans made in the same main scan area be nine or fewer, even more preferably seven or fewer, in particular six or fewer, especially five or fewer. There is no lower limit; the number of main scans is one or more. Preferably, the number of main scans is two or more, more preferably three or more.

When the resolution, or the number of dots (number of ink droplets) per unit area, and the ink loading are constant, fewer main scans are useful because in that case the recording job will speed up. Advantageously, furthermore, water condensation at the head is also reduced.

With fewer main scans, on the other hand, more dots are ejected simultaneously, which means more ink droplets combine. The recorded article, therefore, tends to be inferior in image quality (coalescence). In the recording method according to this embodiment, however, good image equality (reduced coalescence) is ensured even when the number of main scans (the number of passes) is in any of the above ranges.

Figure 2:
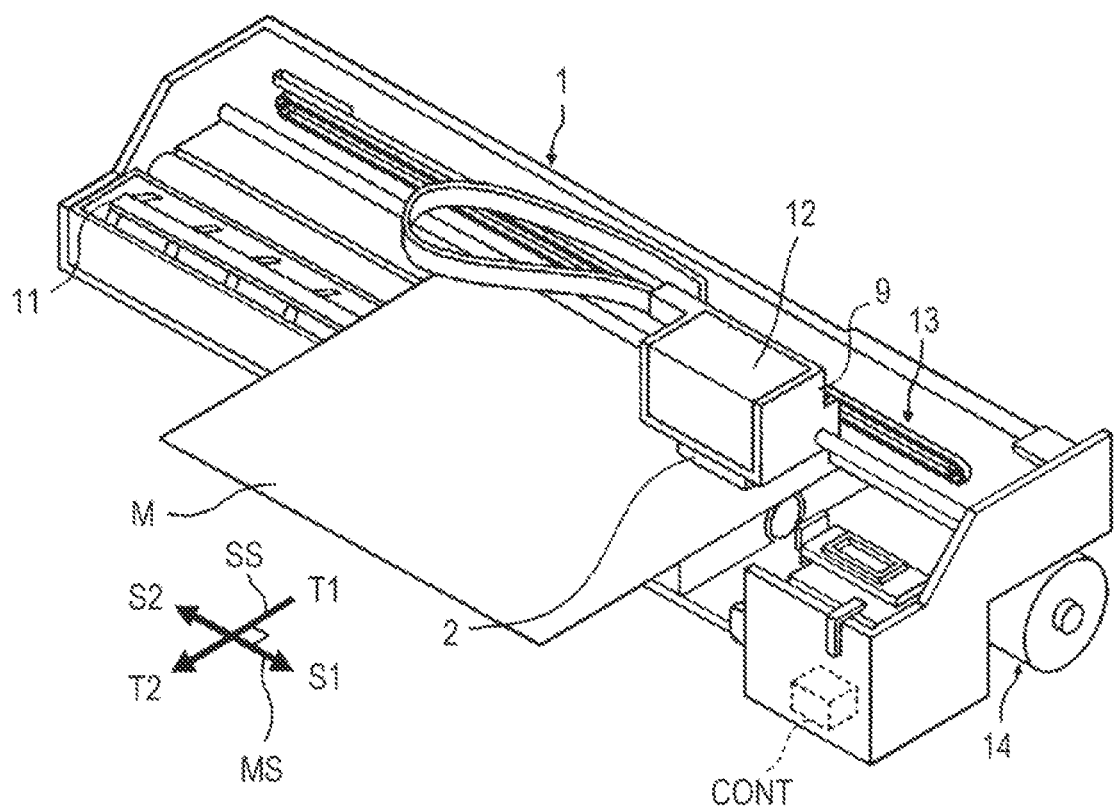
FIG. 2 is a schematic view of an example of an ink jet recording apparatus used in a recording method according to an embodiment, illustrating its carriage and related components.

"A main scan in which the relative positions of the recording medium and the ink jet head are changed" represents, when an ink jet recording apparatus 1 as illustrated in FIGS. 1 and 2 is used for example, a scan that the ink jet head 2, which is a serial recording head, makes in the main scan direction MS (i.e., the direction indicated by either arrow S1 or arrow S2) over the recording medium M.

The number of main scans made in the same scan area means that total number of main scans are made when a main scan is repeated in such a manner that the area on the recording medium M the ink jet head 2 scans in one main scan overlaps at least part of that in another, representing how many times a given point of the recording medium faces the ink jet head as a result of the main scans. For example, when the distance of one sub-scan (transport of the recording medium M) is shorter than the length of the ink-ejecting row of nozzles (not illustrated) in the sub-scan direction SS, it means an area scanned in one main scan is scanned again. When the distance of one sub-scan is ⅛ of the ink-ejecting row of nozzles in the sub-scan direction SS, for example, it means eight main scans are made in the same scan area. This case is described as the number of main scans being eight.

Preferably, the duration of one main scan is from 0.5 to 5 seconds, more preferably from 1 to 4 seconds, even more preferably from 2 to 3 seconds. The duration of one main scan (also referred to as the main scan time) is the length of time required by a given point of the head to move from where it faces one end of the recording medium to where it faces the other end in one main scan.

A long main scan time is useful because in that case a wider image, or an image larger in the main scan direction, can be recorded. A short main scan time is advantageous as it helps reduce water condensation at the head.

Water condensation at the head is the condensation of water that occurs on the nozzle side, for example, of the head. This is the attachment of, for example, water vapor produced when the ink dries, to the head as a result of condensation.

The ink attachment step may be carried out with the surface temperature of the recording medium to which the above ink jet ink composition is attached being 45° C. or below. That is, the ink attachment step may be carried out without heating the recording medium or may be carried out with heating the recording medium, and even when heated, it is preferred that the recording medium be heated in such a manner that its surface temperature will stay at 45° C. or below. When the recording medium is heated, furthermore, it is preferred that the recording method include the first heating step described below.

More preferably, the surface temperature of the recording medium is 42° C. or below, even more preferably 38° C. or below, in particular 32° C. or below, especially 28° C. or below for the upper limit. As for the lower limit, it is preferred that the surface temperature be 20° C. or above, more preferably 23° C. or above, in particular 25° C. or above. When the first heating step is carried out, it is preferred that the surface temperature be 30° C. or above, more preferably 35° C. or above.

Attaching an ink jet ink composition to a recording medium having a high surface temperature tends to help reduce the coalescence of dots because in that case the ink attached to the recording medium dries soon. This, however, has its drawbacks such as unevenness in gloss (gloss-banding irregularities), slow recovery from clogging, and increased water condensation at the ink jet head. The recording method according to this embodiment, by comparison, is superior in unevenness in gloss (gloss-banding irregularities), recovery from clogging, and water condensation, too, because it delivers good image quality (coalescence) even when the surface temperature of the recording medium in its ink attachment step is in any of the above ranges, or even below these ranges in particular.

2.2 First Heating Step

The recording method according to this embodiment may include a first heating step, in which the above ink jet ink composition attached to the recording medium is heated. With such a step, it is easier to ensure the recording medium has an appropriate surface temperature when the ink jet ink composition is attached thereto. Good image quality (coalescence) is encouraged in consequence.

The first heating step is drying ink attached to the recording medium immediately by heating it. The first heating step is a heating step for drying ink attached to the recording medium, or at least part of its solvent component, at least to such an extent that the flow of the ink will be reduced. The first heating step may be configured so that the ink will be attached to a heated recording medium or may be configured so that the ink will be heated immediately after it is attached. Preferably, the heating of ink droplets on the recording medium in the first heating step is started not later than 0.5 seconds after the landing of the ink droplets.

Preferably, the first heating step is by heating with an IR heater, microwave radiation, heating with a platen heater, or sending warm air to the recording medium with a fan.

That is, examples of heating mechanisms that can be used include conduction heating, for example with a platen heater, radiation heating, for example with an IR or microwave heater, and air-blow heating, for example with a fan. Any one or more of these can be used.

When any heating mechanism other than air-blow heating is combined when air-blow heating is used, the air-blow heating may be that with ambient air. That is, the air sent in air-blow heating may be ambient air. Even ambient air helps accelerate the drying of the ink; indeed, using ambient air is advantageous because in that case the recording method is better in, for example, recovery from clogging.

When the heating is carried out by air-blow heating, warm air is preferred.

When air-blow heating is used, it is preferred that the velocity of the air be from 0.5 to 10 m/s, more preferably from 1 to 5 m/s, even more preferably from 2 to 3 m/s. This velocity of air is the velocity of the air near the surface of the recording medium. A velocity of air in any of or faster than these ranges is advantageous because in that case the recording method is better in, for example, image quality and the reduction of water condensation at the head. A velocity of air in any of or slower than these ranges is advantageous because in that case the recording method is better in, for example, recovery from clogging.

Preferably, the temperature of the air in air-blow heating is 50° C. or below, preferably 10° C. or above. It is preferred that the temperature of the air be from 15° C. to 45° C., more preferably from 20° C. to 49° C.

The heating in the first heating step only needs to take place at at least one of the time points of before the above ink attachment step, simultaneously with the attachment, and soon after the attachment, preferably is performed simultaneously with the attachment. The ink attachment step can be carried out with such an order of heating.

When the ink is attached to a heated recording medium, the heating temperature in the first heating step is the surface temperature of the recording medium when the ink is attached thereto. When the ink is heated soon after it is attached, the heating temperature is the surface temperature of the recording medium to which it is heated. Alternatively, it is the highest temperature, during heating, reached by the first heating step.

The surface temperature of the recording medium reached by the first heating step only needs to be, preferably is, in any of the ranges specified above as those for the surface temperature of the recording medium when the ink jet ink composition is attached thereto.

2.3 Treatment Liquid Attachment Step

The recording method according to this embodiment may be one that includes attaching a flocculant-containing treatment liquid to the recording medium (treatment liquid attachment step). With such a step, better image quality (reduction of coalescence) will be achieved by virtue of the pinning effect produced through reaction between the treatment liquid and the ink composition.

How to attach the treatment liquid to the recording medium can be by any one or a combination of non-contact or contact techniques, such as ink jet technology, coating, applying the treatment liquid to the recording medium with sprays, applying the treatment liquid to the recording medium by dipping it in, or applying the treatment liquid using a brush or similar tools.

The treatment liquid attachment step may be carried out by, for example, using an ink jet recording apparatus 1 as illustrated in FIG. 1 and ejecting the treatment liquid from its ink jet head 2. Such a way of attachment is more advantageous than others because in that case the treatment liquid and the ink jet ink composition can be attached to the recording medium with one ink jet recording apparatus.

The treatment liquid attachment step may be before the attachment of the ink composition or may be after the attachment of the ink composition, or may even be simultaneous with the attachment of the ink composition. When the treatment liquid is attached before or simultaneously with the attachment of the ink composition, it is preferred that the recording medium be heated with a preheater 7 as illustrated in FIG. 1 before the treatment liquid attachment step or with an IR heater 3 or platen heater 4 during the treatment liquid attachment step. Attaching the treatment liquid to a heated recording medium can help apply the treatment liquid uniformly by encouraging spread, on the recording medium, of the treatment liquid ejected onto the recording medium. When this occurs, image quality tends to be good by virtue of sufficient reaction between the ink composition attached in the above ink attachment and the treatment liquid. Since the treatment liquid is applied uniformly on the recording medium M, furthermore, the amount of liquid applied is smaller, and this can help prevent the resulting image from losing its abrasion resistance.

Preferably, the treatment liquid loading is from 0.1 to 5 mg/inch$^2$, more preferably from 0.3 to 4 mg/inch$^2$, even more preferably from 0.5 to 3 mg/inch$^2$, in particular from 0.7 to 1.5 mg/inch$^2$, per unit area of the recording region of the recording medium. It is also preferred that the maximum treatment liquid loading, in the recording job, per unit area of the recording region of the recording medium be in any of these ranges.

Using a treatment liquid encourages good image quality (coalescence), but in a large amount, it causes issues such as the recorded article often being inferior in, for example, abrasion resistance. The ink jet ink composition used in the recording method according to this embodiment, containing particular ingredients, has delivered good image quality (coalescence) by virtue of the pinning effect of the ink itself. By setting the treatment liquid loading in any of these ranges, therefore, better image quality (coalescence) can be achieved along with abrasion resistance high enough.

The following describes ingredients in the treatment liquid.

Treatment Liquid

The treatment liquid is one that contains at least one flocculant.

Flocculant(s)

The flocculant has the function to cause at least one of dispersed ingredients in the ink jet ink composition, such as resin(s) and pigment(s), to flocculate together by acting on the dispersibility of these ingredients. The degree of flocculation of the dispersed ingredient(s) can be controlled as it varies with the type of flocculant and target ingredient(s). Such a flocculating effect helps, for example, raise the color strength and/or fixation of the image.

The flocculant can be of any kind, but examples include metal salts, acids, and cationic compounds, and cationic compounds that can be used include cationic resins (cationic polymers) and cationic surfactants. Of these, polyvalent metal salts are particularly preferred in the category of metal salts, and cationic resins are particularly preferred in the category of cationic compounds. As for acids, examples include organic acids and inorganic acids, with organic acids preferred. It is, therefore, preferred that the flocculant be selected from cationic resins, organic acids, and polyvalent metal salts because in that case the recorded article will be superb in image quality, abrasion resistance, gloss, etc.

Metal Salts

For metal salts, polyvalent metal salts are preferred but other metal salts can also be used. In the above categories of flocculants, it is particularly preferred to use at least one selected from metal salts and organic acids because they are highly reactive with ingredients in the ink. Of cationic compounds, furthermore, cationic resins are particularly preferred because they dissolve well in the treatment liquid. It is also possible to use multiple flocculants in combination.

Polyvalent metal salts are compounds formed by a divalent or higher-valency metal ion and an anion. Examples of divalent or higher-valency metal ions include the ions of calcium, magnesium, copper, nickel, zinc, barium, aluminum, titanium, strontium, chromium, cobalt, iron, etc. Of such metal ions that can be a component of a polyvalent metal salt, it is particularly preferred to use at least one of the calcium or magnesium ion because these ions are potent flocculants for ingredients in the ink.

The anion as a component of a polyvalent metal salt is an inorganic or organic ion. That is, a polyvalent metal salt in an aspect of the present disclosure is one formed by an inorganic or organic ion and a polyvalent metal. Examples of such inorganic ions include the chloride ion, bromide ion, iodide ion, nitrate ion, sulfate ion, and hydroxide ion. Examples of organic ions include organic acid ions, such as the carboxylate ion.

Preferably, the polyvalent metal compound is an ionic polyvalent metal salt, and the stability of the treatment liquid is better when the polyvalent metal salt is a magnesium or calcium salt. The counterion for the polyvalent metal may be either an inorganic acid or organic acid ion.

Specific examples of polyvalent metal salts include calcium carbonates, such as heavy calcium carbonate and light calcium carbonate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, copper nitrate, calcium acetate, magnesium acetate, aluminum acetate, calcium propionate, magnesium propionate, aluminum propionate, calcium lactate, magnesium lactate, and aluminum lactate. One such polyvalent metal salt may be used alone, or two or more may be used in combination. Of these, it is particularly preferred to use at least one of magnesium sulfate, calcium nitrate, aluminum lactate, or calcium propionate because these salts dissolve sufficiently well in water. Such metal may be hydrated in their raw-material form.

Examples of metal salts other than polyvalent metal salts include salts of monovalent metals, such as sodium salts and potassium salts, including sodium sulfate and potassium sulfate.

Acids

Examples of suitable organic acids include poly(meth)acrylic acid, formic acid, acetic acid, propionic acid, glycolic acid, oxalic acid, malonic acid, malic acid, maleic acid, ascorbic acid, succinic acid, glutaric acid, adipic acid, fumaric acid, citric acid, tartaric acid, lactic acid, pyruvic acid, pyrrolidonecarboxylic acid, pyronecarboxylic acid, pyrrolecarboxylic acid, furancarboxylic acid, pyridinecarboxylic acid, coumarinic acid, thiophenecarboxylic acid, nicotinic acid, and derivatives of these compounds as well as salts thereof. One organic acid may be used alone, or two or more may be used in combination. Salts of organic or inorganic acids that are also polyvalent metal salts are included in the above polyvalent metal salts.

Examples of inorganic acids include sulfuric acid, hydrochloric acid, nitric acid, and phosphoric acid. One inorganic acid may be used alone, or two or more may be used in combination.

Cationic Compounds

Examples of cationic resins (cationic polymers) include cationic urethane resins, cationic olefin resins, cationic amine resins, and cationic surfactants.

For cationic urethane resins, commercially available ones can be used, including HYDRAN CP-7010, CP-7020, CP-7030, CP-7040, CP-7050, CP-7060, and CP-7610 (trade names, Dainippon Ink and Chemicals, Inc.), SUPERFLEX 600, 610, 620, 630, 640, and 650 (trade names, DKS Co. Ltd.), and WBR-2120C and WBR-2122C urethane emulsions (trade names, Taisei Fine Chemical Co., Ltd.).

The cationic olefin resins are those having ethylene, propylene, or any other olefin as their structural backbone, and suitable one(s) can be selected from known ones. Cationic olefin resins may be in emulsion form, in which the resins are dispersed in solvents including water, organic solvents, etc. Commercially available cationic olefin resins can be used, including ARROWBASE CB-1200 and CD-1200 (trade names, Unitika Ltd.).

The cationic amine resins (cationic amine polymers) include any of them having an amino group in its structure, and suitable one(s) can be selected from known ones. Examples include polyamine resins, polyamide resins, and polyallylamine resins. Polyamine resins are resins having an amino group in their polymer backbone. Polyamide resins are resins having an amide group in their polymer backbone. Polyallylamine resins are resins have an allyl-derived structure in their polymer backbone.

Examples of cationic polyamine resins include Senka Corporation's UNISENCE KHE103L (hexamethylenediamine/epichlorohydrin resin; pH of a 1% aqueous solution, approximately 5.0; viscosity, 20 to 50 (mPa·s); a 50% by mass solids aqueous solution) and UNISENCE KHE104L (dimethylamine/epichlorohydrin resin; pH of a 1% aqueous solution, approximately 7.0; viscosity, 1 to 10 (mPa·s); a 20% by mass solids aqueous solution) Further specific examples of commercially available cationic polyamine resins include FL-14 (SNF), ARAFIX 100, 251S, 255, and 255LOX (Arakawa Chemical), DK-6810, 6853, and 6885; and WS-4010, 4011, 4020, 4024, 4027, and 4030 (Seiko PMC), PAPYOGEN P-105 (Senka), Sumirez Resin 650(30), 675A, 6615, and SLX-1 (Taoka Chemical), Catiomaster® PD-1, 7, 30, A, PDT-2, PE-10, PE-30, DT-EH, EPA-SK01, and TMHMDA-E (Yokkaichi Chemical), and JETFIX 36N, 38A, and 5052 (Satoda Chemical Industrial).

Examples of polyallylamine resins include polyallylamine hydrochloride, polyallylamine amidosulfate, allylamine hydrochloride-diallylamine hydrochloride copolymers, allylamine acetate-diallylamine acetate copolymers, allylamine acetate-diallylamine acetate copolymers, allylamine hydrochloride-dimethylallylamine hydrochloride copolymers, allylamine-dimethylallylamine copolymers, polydiallylamine hydrochloride, polymethyldiallylamine hydrochloride, polymethyldiallylamine amidosulfate, polymethyldiallylamine acetate, polydiallyldimethylammonium chloride, diallylamine acetate-sulfur dioxide copolymers, diallylmethylethylammonium ethyl sulfite-sulfur dioxide copolymers, methyldiallylamine hydrochloride-sulfur dioxide copolymers, diallyldimethylammonium chloride-sulfur dioxide copolymers, and diallyldimethylammonium chloride-acrylamide copolymers.

As for cationic surfactants, examples include primary-, secondary-, or tertiary-amine salt compounds, alkylamine salts, dialkylamine salts, aliphatic amine salts, benzalkonium salts, quaternary ammonium salts, quaternary alkylammonium salts, alkylpyridinium salts, sulfonium salts, phosphonium salts, onium salts, and imidazolinium salts. Specific examples include hydrochlorides, acetates, and similar salts of laurylamine, coconut amine, and rosin amine and lauryltrimethylammonium chloride, cetyltrimethylammonium chloride, benzyltributylammonium chloride, benzalkonium chlorides, dimethylethyllaurylammonium ethyl sulfate, dimethylethyloctylammonium ethyl sulfate, trimethyllaurylammonium hydrochloride, cetylpyridinium chloride, cetylpyridinium bromide, dihydroxyethyllaurylamine, decyldimethylbenzylammonium chloride, dodecyldimethylbenzylammonium chloride, tetradecyldimethylammonium chloride, hexadecyldimethylammonium chloride, and octadecyldimethylammonium chloride. It should be noted that although cationic surfactants function as flocculants as described below, the ink jet ink composition may contain one or more of them. More preferably, however, the treatment liquid contains cationic surfactant(s) as flocculant(s).

It is also possible to use multiple ones of such flocculants. Selecting at least one from polyvalent metal salts, organic acids, and cationic resins helps form an image of higher quality (good in color strength in particular) because flocculants in these categories are better than others in their flocculating effects.

The total flocculant content of the treatment liquid is 0.1% by mass or more and 20% by mass or less for example, preferably 1% by mass or more and 20% by mass or less, more preferably 2% by mass or more and 15% by mass or less of the total mass of the treatment liquid. When flocculant(s) in solution or emulsion form is used, too, it is preferred that the flocculant content on a solids basis be in any of these ranges. A flocculant content of 1% by mass or more is enough for the flocculant(s) to flocculate the relevant ingredient(s) in the ink effectively. A flocculant content of 30% by mass or less leads to better dissolution or dispersion of the flocculant(s) in the treatment liquid, thereby helping improve, for example, the storage stability of the treatment liquid.

Preferably, the flocculant is one(s) having a solubility of 1 g or more, more preferably 3 g or more and 80 g or less, in 100 g of water at 25° C. because this ensures the flocculant(s) dissolves well in the treatment liquid even when the organic solvents that can be contained in the treatment liquid are highly hydrophobic.

Specific Low-Molecular-Weight Organic Compound(s) and Specific Diol(s)

The treatment liquid may contain at least one water-soluble low-molecular-weight organic compound that has a melting point of 30° C. or above and is any of an amide, sulfur-containing compound, or cyclic ether (specific low-molecular-weight organic compound) and at least one organic solvent that is a diol having a melting point of 25° C. or below (specific diol).

Specific low-molecular-weight organic compounds help make the recorded article better in abrasion resistance with their resin solubility, the ability to make resins in ink and low- or non-absorbent recording media swell and dissolve. Adding specific diol(s), furthermore, is an easy way to tailor the treatment liquid to appropriate ejection characteristics.

The specific low-molecular-weight organic compound and the specific diol are not described here; they are the same as described above in relation to the ink jet ink composition. Their absolute and relative percentages, for example, can also be, preferably are, the same as described above in relation to the ink jet ink composition.

Extra Ingredients

Besides these ingredients, the treatment liquid may contain ingredients like resins, water, organic solvents other than specific diols, waxes, defoamers, surfactants, alkanolamines, additives, preservatives/antimolds, antirusts, chelating agents, antioxidants, and fungicides unless its functions are impaired. The details of such ingredients are not described; they are the same as described above in relation to the ink jet ink composition. Preferably, the treatment liquid is a water-based treatment liquid.

The treatment liquid is obtained by mixing the above ingredients in any order, optionally with subsequent removal of impurities, for example by filtration. A suitable method for mixing the ingredients is to add the materials to a container equipped with a stirring device, such as a mechanical or magnetic stirrer, and mixing the materials together by stirring.

2.4 Postheating Step

The recording method according to this embodiment may include a postheating step, in which the recording medium is heated with the attached above ink jet ink composition thereon. This is advantageous in that the recorded article tends to be better in abrasion resistance by virtue of further improved drying.

The postheating step is a heating step that finishes the recording job and in which the recorded article is heated enough that it will be ready for use. The postheating step is a heating step for sufficient drying of the solvent component of the ink and for planarizing the ink coating by heating the resin(s), for example, contained in the ink. Preferably, the postheating step is started more than 0.5 seconds after the ink adheres to the recording medium. For example, it is preferred that a given recording region of the recording medium start being heated more than 0.5 seconds after the attachment of the ink assigned thereto is totally complete. Preferably, temperatures preferred in the above first heating step and those in the postheating step are different.

When an ink jet recording apparatus is used, for example, the heating of the recording medium in the postheating step can be carried out using an appropriate heater. The heating, furthermore, does not need to be performed with a heater that comes with the ink jet recording apparatus but can be done with any appropriate heater.

Preferably, the surface temperature of the recording medium in the postheating step is 50° C. or above, more preferably 60° C. or above, even more preferably 70° C. or above, in particular 75° C. or above for the lower limit. As for the upper limit, it is preferred that the surface temperature be 120° C. or below, more preferably 110° C. or below, even more preferably 100° C. or below, in particular 90° C. or below.

2.5 Ink Jet Recording Apparatus

The following describes an example of an ink jet recording apparatus suitable for the recording method according to this embodiment with reference to drawings. The ink jet recording apparatus includes an ink jet head, which performs the ink attachment step, or the attachment of the ink jet ink composition, and also includes a first heating mechanism. The ink jet recording apparatus, furthermore, is configured to carry out the above recording method.

FIG. 1 is an outline cross-sectional diagram schematically illustrating the ink jet recording apparatus. FIG. 2 is a perspective view of the ink jet recording apparatus 1 in FIG. 1, illustrating its carriage and related components in their exemplary configuration. As illustrated in FIGS. 1 and 2, the ink jet recording apparatus 1 includes an ink jet head 2, an IR heater 3, a platen heater 4, a heating heater 5, a cooling fan 6, a preheater 7, an aeration fan 8, a carriage 9, a platen 11, a carriage-moving mechanism 13, a transporter 14, and a control section CONT. The ink jet recording apparatus 1 has its overall operation controlled by its control section CONT, illustrated in FIG. 2.

The ink jet head 2 is configured to perform recording on a recording medium M by ejecting the treatment liquid and the ink jet ink composition through its nozzles and attaching them. In this embodiment, the ink jet head 2 is a serial ink jet head; it attaches the ink to the recording medium M by running relative to the recording medium M in the main scan direction multiple times. The ink jet head 2 is placed on the carriage 9, illustrated in FIG. 2. As the carriage-moving mechanism 13 operates to move the carriage 9 in the direction of medium width, or along the width of the recording medium M, the ink jet head 2 is caused to run relative to the recording medium M in the main scan direction multiple times. The direction of medium width is the main scan direction, in which the ink jet head 2 runs. An act of running in the main scan direction is also referred to as a main scan.

The main scan direction, furthermore, is the direction in which the carriage 9 moves with the ink jet head 2 thereon. In FIG. 1, it is a direction that crosses the sub-scan direction, indicated by arrow SS, which is the direction of transport of the recording medium M. In FIG. 2, the direction along the width of the recording medium M, i.e., the direction indicated by S1-S2, is the main scan direction MS, and the direction indicated by T1→T2 is the sub-scan direction SS. It should be noted that the ink jet head 2 runs in the main scan direction, i.e., in any one of the direction of arrow S1 or that of arrow S2, in the time frame of one scan, and a main scan, made by the ink jet head 2, and a sub-scan, which is the transport of the recording medium M, are repeated to record on the recording medium M. That is, the treatment liquid and ink attachment steps are carried out through multiple main scans, in which the ink jet head 2 moves in the main scan direction, and multiple sub-scans, in which the recording medium M moves in the sub-scan direction, which crosses the main scan direction.

The cartridge assembly 12, which supplies the ink jet ink composition and the treatment liquid separately to the ink jet head 2, includes multiple independent cartridges. The cartridge assembly 12 is detachably attached to the carriage 9 carrying the ink jet head 2 thereon. Each of the multiple cartridges holds a different kind of ink jet ink composition or treatment liquid, and the ink jet ink composition and the treatment liquid are supplied from the cartridge assembly 12 to each nozzle. Although the cartridge assembly 12 illustrated by way of example in this embodiment is placed on the carriage 9, this is not the only possible configuration; it may be provided somewhere other than the carriage 9, and the ink and treatment liquid may be supplied to each nozzle through feed tubing not illustrated.

The ejection from the ink jet head 2 can be based on a known mechanism. In this embodiment, the ejection mechanism is that in which vibrations of piezoelectric elements are used to eject droplets, i.e., the formation of ink droplets by mechanical deformation of electrostrictive elements.

The ink jet recording apparatus 1 includes an IR heater 3 and a platen heater 4 for heating the recording medium M during the ejection of the ink jet ink composition from the ink jet head 2. With the IR heater 3 or platen heater 4, the first heating step can be carried out. When the recording medium M is dried in the first heating step in this embodiment, the aeration fan 8 described below, for example, can be used.

It should be noted that by using the IR heater 3, the recording medium M can be heated from the ink jet head 2 side by radiation heating, by irradiation with infrared rays. This often causes the ink jet head 2, too, to be heated together, but compared with when the recording medium M is heated from its backside, for example by the platen heater 4, the temperature elevation is not influenced by the thickness of the recording medium M. The ink jet recording apparatus 1 may include fans that dry the ink on the recording medium M by blowing warm air or air at the ambient temperature against the recording medium M (e.g., an aeration fan 8).

The platen heater 4 is configured to heat the recording medium M, with the platen 11 therebetween, at a position where it faces the ink jet head 2 so that the treatment liquid and the ink jet ink composition ejected from the ink jet head 2 will dry soon after being attached to the recording medium M. The platen heater 4 is configured to heat the recording medium M by conduction heating, and, in the recording method according to this embodiment, this allows the ink jet ink composition to be attached to a heated recording medium M (first heating). The ink jet ink composition, therefore, becomes fixed fast on the recording medium M, helping improve image quality.

The heating heater 5 is a heater that dries and solidifies the treatment liquid and the ink jet ink composition attached to the recording medium M, i.e., a heater for secondary heating or secondary drying. The heating heater 5 can be used in the postheating step. By virtue of the heating of the recoding medium M with a recorded image thereon by the heating heater 5, the water, for example, in the ink jet ink composition evaporates away more quickly than otherwise The resin(s) in the ink jet ink composition forms an ink film, and this ink film becomes firmly fixed on or adheres strongly to the recording medium M. Superior film formation in such a way helps produce a good and high-quality image in a short time.

The ink jet recording apparatus 1 may have a cooling fan 6. By drying the ink jet ink composition recorded on the recording medium M and then cooling it on the recording medium M with the cooling fan 6, a highly adhesive ink coating can be formed on the recording medium M.

The ink jet recording apparatus 1 may include a preheater 7 that heats the recording medium M preliminarily, before the ink jet ink composition is attached to the recording medium M. The ink jet recording apparatus 1, furthermore, may include an aeration fan 8 so that the ink jet ink composition attached to the recording medium M will dry more efficiently.

Under the carriage 9 are a platen 11, which supports the recording medium M, a carriage-moving mechanism 13, which moves the carriage 9 relative to the recording medium M, and a transporter 14, which is a roller that transports the recording medium M in the sub-scan direction. The operation of the carriage-moving mechanism 13 and the transporter 14 is controlled by the control section CONT.

Figure 3:
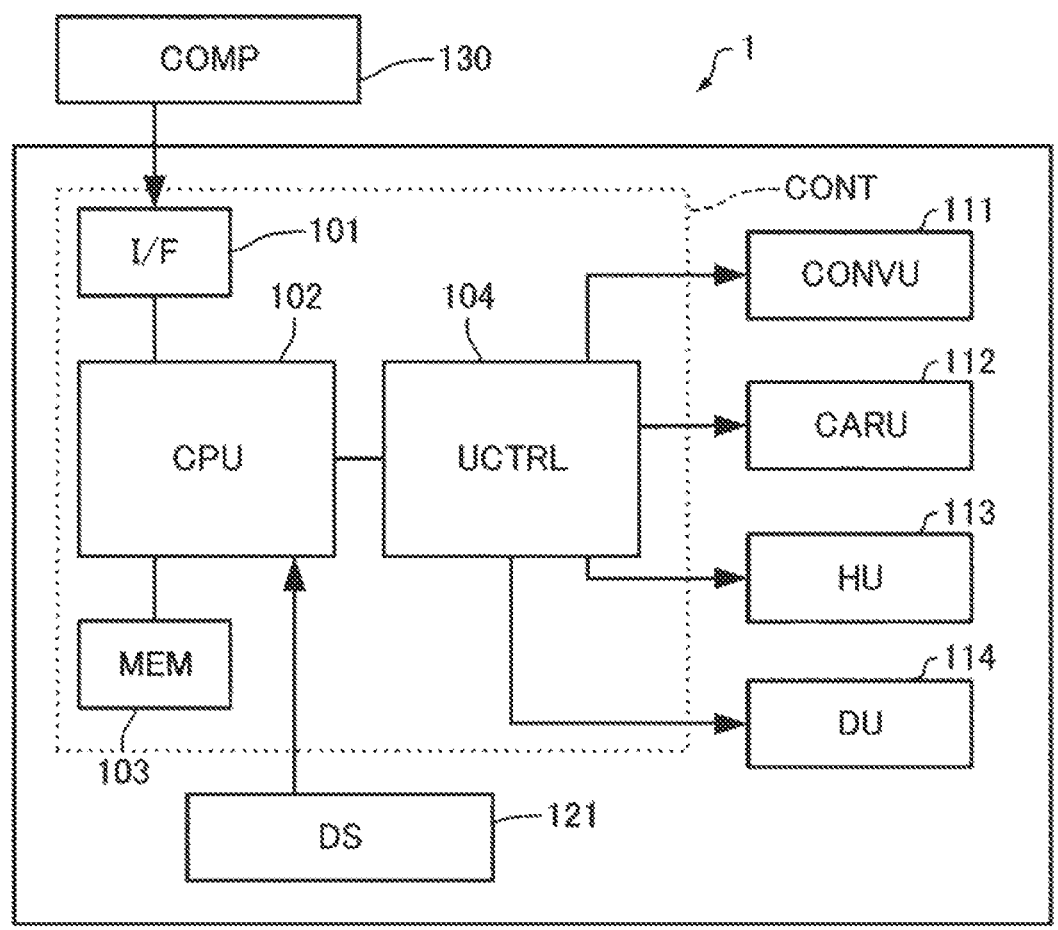
FIG. 3 is a block diagram for an example of an ink jet recording apparatus used in a recording method according to an embodiment.

FIG. 3 is a functional block diagram for the ink jet recording apparatus 1. The control section CONT is a control unit for controlling the ink jet recording apparatus 1. The interface 101 (I/F) is for data exchange between a computer 130 (COMP) and the ink jet recording apparatus 1. The CPU 102 is a processing unit for overall control of the ink jet recording apparatus 1. The memory 103 (MEM) is for, for example, storing programs in and providing workspace for the CPU 102. The CPU 102 controls each unit via a unit control circuit 104 (UCTRL). A set of detectors 121 (DS) monitor the internal status of the ink jet recording apparatus 1, and, based on the detection results, the control section CONT controls each unit.

The transport unit 111 (CONVU) is one that controls the sub-scans (transport) in ink jet recording jobs, specifically the direction and speed of transport of the recording medium M. Specifically, it controls the direction and speed of transport of the recording medium M by controlling the direction and speed of rotation of a motor-driven transport roller.

The carriage unit 112 (CARU) is one that controls the main scans (passes) in ink jet recording jobs, or, specifically, moves the ink jet head 2 back and forth in the main scan direction. The carriage unit 112 includes a carriage 9 with the ink jet head 2 thereon and a carriage-moving mechanism 13, a mechanism for moving the carriage 9 back and forth.

The head unit 113 (HU) is one that controls the volume of the ink jet ink composition and the treatment liquid ejected from the nozzles of the ink jet head 2. For example, when the nozzles of the ink jet head 2 are ones driven by piezoelectric elements, it controls the operation of the piezoelectric element in each nozzle. By the head unit 113, the time when to attach each ink or treatment liquid, the size of dots of the ink jet ink composition and the treatment liquid, etc., are controlled. The carriage unit 112 and the head unit 113, furthermore, work together to control the volume of the ink jet ink composition and the treatment liquid attached per scan.

The drying unit 114 (DU) controls the temperature of heaters, such as the IR heater 3, preheater 7, platen heater 4, and heating heater 5.

This ink jet recording apparatus 1 alternates the operation of moving the carriage 9, with the ink jet head 2 thereon, in the main scan direction and a transport operation (sub-scan). During this, the control section CONT controls the carriage unit 112 in each pass to make it move the ink jet head 2 in the main scan direction and controls the head unit 113 at the same time to make the ink jet head 2 eject droplets of the ink jet ink composition from its predetermined nozzle orifices and attach them to the recording medium M. The control section CONT, furthermore, controls the transport unit 111 to make it transport the recording medium M in the direction of transport by a predetermined distance (feed) during the transport operation.

As the ink jet recording apparatus 1 repeats a main scan (pass) and a sub-scan (transport operation), the recording region is transported little by little with multiple attached droplets thereon. Then the after heater 5 is used to dry the droplets attached to the recording medium M, finishing the image. The finished recorded article may then be wound into a roll by a reel mechanism or transported on a flatbed mechanism.

Figure 4:
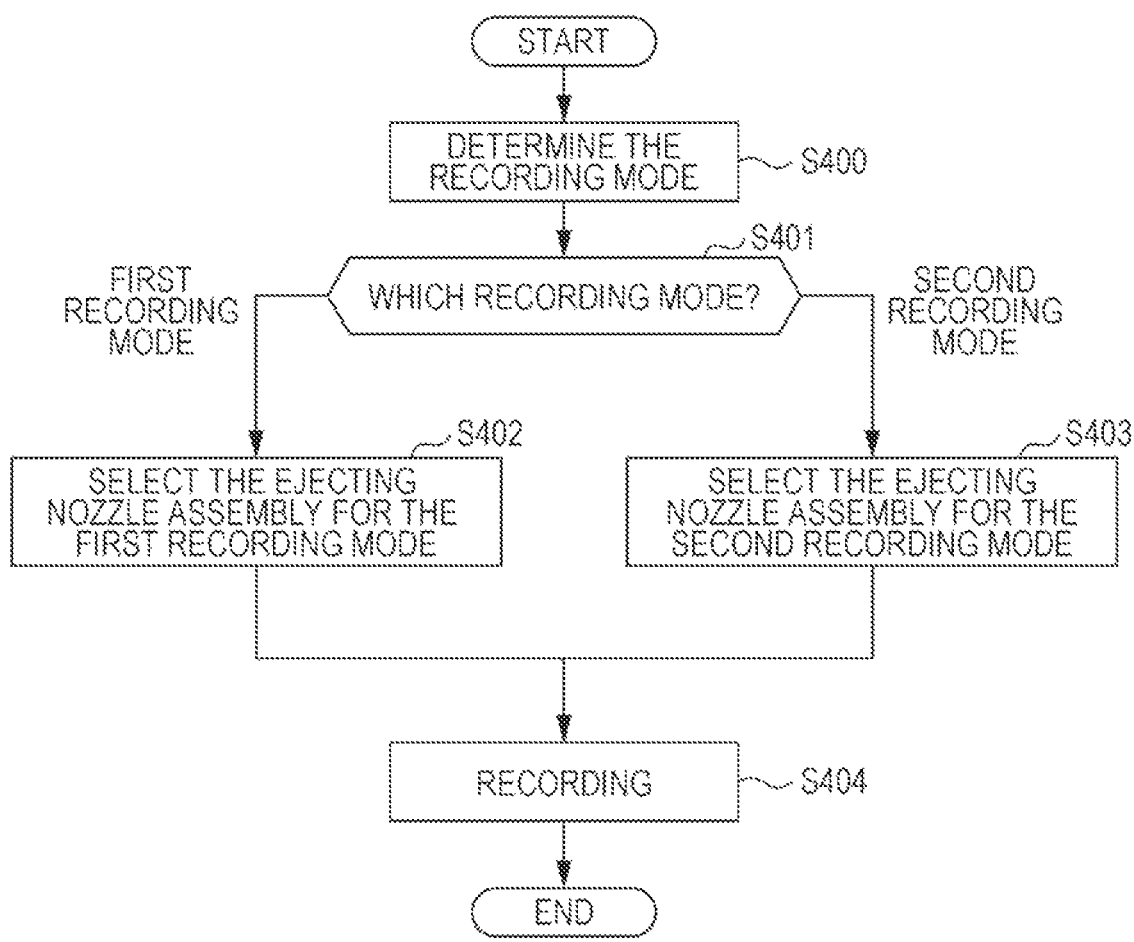
FIG. 4 is a flowchart illustrating an example of a process that is performed in recording with an ink jet recording apparatus used in a recording method according to an embodiment.

FIG. 4 is an example of a flowchart illustrating the process the ink jet recording apparatus carries out when it performs a recording job. To start a recording job, the control section of the ink jet recording apparatus determines the recording mode in step S400. The recording mode is a collection of detailed instructions for the recording job, including nozzle arrangement, ejection volumes, the overlap between dots, the motion of the ink jet head and that of the recording medium during the recording job, and the control of heating mechanisms. The detailed instructions also include the number of passes in the recording job (how many main scans are made in the same recording region of the recording medium).

The recording mode is determined based on, for example, an input signal sent from external equipment, such as a computer, to the ink jet recording apparatus, or information the user inputs to a user input interface the ink jet recording apparatus has. The input signal from external equipment or the information input by the user may be a direct specifier of the recording mode or may be parameters about the recording job, such as the type of recording medium used, recording speed designation, and image quality designation. These, furthermore, are not the only possible recording job parameters. In the latter case, the ink jet recording apparatus stores inside, for example in its control section, preinstalled matching information as a set of rules that determine the relationship between the parameters and recording modes, and determines the recording mode with reference to the matching information. Alternatively, the recording mode may be determined using AI technology (artificial intelligence technology).

In step S401, the determined recording mode is recognized. In step S402 or S403, the number of passes, linked with the recording mode, is selected based on the determined recording mode. In step S404 the recording job is executed. Although the number of recording modes in the drawing is two, the first and second recording modes, there may be three or more.

In the illustrated example, the recording apparatus is configured to change the number of passes (how many main scans are made in the same recording region of the recording medium) in the recording job according to the recording mode. This is advantageous in that a wide variety of recording jobs are supported.

The ink jet recording apparatus in FIGS. 1 and 2 is a serial one, but a line ink jet recording apparatus can also be used.

With this ink jet recording apparatus described by way of example, the recording method according to this embodiment can be performed in a suitable way.

3. EXAMPLES

The following describes aspects of the present disclosure in further detail by providing examples, but no aspect of the present disclosure is limited to these examples. In the following, "%" is by mass unless stated otherwise.

3.1 Preparation of Ink Jet Ink Compositions

Ink jet ink compositions according to examples and comparative examples were obtained by putting ingredients according to the formula in Table 1 or 2 below into a container, mixing them together and stirring the mixture for 2 hours using a magnetic stirrer, and filtering the product through a 5-μm membrane filter. All numeric values in Tables 1 and 2 below are in % by mass, and the purified water was added to make the total mass of the ink jet ink composition 100% by mass. The liquid dispersion of pigment and the resin were those prepared as described below beforehand. The values for the liquid dispersion of pigment and the resin in the tables represent the amounts of their active ingredients (amounts on a solids basis).

Preparation of the Liquid Dispersion of Pigment

Fifty grams of methyl ethyl ketone (MEK) was added to a flask equipped with a dropping funnel, a nitrogen inlet tube, a reflux condenser, a thermometer, and a stirring device, and the MEK was warmed to 75° C. while being bubbled with nitrogen. To the warmed ketone, a mixture of 80 g of butyl methacrylate, 50 g of methyl methacrylate, 15 g of styrene, and 20 g of methacrylic acid as monomers, 50 g of MEK, and 500 mg of a polymerization initiator (azobisisobutyronitrile, AIBN) was added dropwise from the dropping funnel over 3 hours. After the addition, the mixture was heated under reflux for another 6 hours and allowed to cool, and then MEK was added to make up for the loss on evaporation, giving a resin solution (resin content on a solids basis, 50% by mass; acid value, 79 mg/KOH; Tg, 65° C.).

To 20 g of this solution, a predetermined amount of a 20% by mass aqueous solution of sodium hydroxide as a neutralizing agent was added to neutralize 100% of salt-forming groups. To the neutralized solution 50 g of pigment (carbon black) was added little by little with stirring, and the product was kneaded in a bead mill for 2 hours.

The resulting paste was stirred with 200 g of deionized water, and then MEK was distilled away by warming under reduced pressure. Then the concentration was adjusted with deionized water, giving a liquid dispersion of pigment (pigment content on a solids basis, 20% by mass; resin content on a solids basis, 5% by weight). The diameter of particles (D50) measured with "Nanotrac Wave II EX-150" (MicrotracBEL Corporation) was 110 nm.

Preparation of the Resins

A reactor equipped with a stirrer, a reflux condenser, a drop dispenser, and a thermometer was loaded with 2600 g of deionized water and 0.5 g of sodium lauryl sulfate. The temperature was elevated to 70° C. while the reactor was purged with nitrogen with stirring. With the internal temperature kept at 70° C., 4 g of potassium persulfate as a polymerization initiator was added and dissolved, and then an emulsion prepared beforehand, by adding 2 g of acrylamide, 180 g of methyl methacrylate, 35 g of butyl methacrylate, and 5 g of methacrylic acid to 300 g of deionized water and 0.5 g of sodium lauryl sulfate with stirring, was added dropwise into the resulting reaction solution continuously over 3 hours.

After the addition was complete, the resulting mixture was aged for 1 hour. After the aging was complete, an emulsion prepared beforehand, by adding 30 g of acrylamide, 850 g of styrene, 750 g of methyl methacrylate, 50 g of 2-ethylhexyl methacrylate, and 40 g of methacrylic acid to 500 g of deionized water and 1.5 g of sodium lauryl sulfate with stirring, was added dropwise to the mixture continuously over 4 hours. After the addition was complete, the resulting mixture was aged for 3 hours.

The resulting aqueous emulsion (acid value, 15 mg/KOH; Tg, 90° C.) was cooled to room temperature, and then deionized water and aqueous sodium hydroxide were added to make the solids content 30% by weight and adjust the pH to 8. The product was resin A, and its particles had a sea-island structure. The diameter of the particles (D50) measured with "Nanotrac Wave II EX-150" (MicrotracBEL Corporation) was 140 nm. Resins B to D were also produced in the same way, with Tg and the diameter of particles controlled by adjusting the proportions between monomers and the speed of stirring during the reaction. The Tg and diameter of particles of the prepared resins will be described later herein.

3.2 Preparation of Treatment Liquids

Treatment liquids according to examples were obtained by putting ingredients according to the formula in Table 3 into a container, mixing them together and stirring the mixture for 2 hours using a magnetic stirrer, and filtering the product through a 5-μm membrane filter. All numeric values in Table 3 are in % by mass, and the purified water was added to make the total mass of the treatment liquid 100% by mass. The value for the cationic resin in the table represents the amount of its active ingredient (amount on a solids basis).

TABLE 1

|  |  |  | Ink A | Ink B | Ink C | Ink D | Ink E | Ink F | Ink G | Ink H | Ink I | Ink J | Ink K |
|---|---|---|---|---|---|---|---|---|---|---|---|---|---|
| Specific low-molecular-weight organic compounds | Amides | CPL (boiling point, 267° C.; melting point, 70° C.) | 4 | 8 | 11 |  |  |  |  |  | 4 | 4 | 8 |
|  |  | 2Pi (boiling point, 256° C.; melting point, 38° C.) |  |  |  | 4 |  |  |  |  |  |  |  |
|  |  | AA (boiling point, 271° C.; melting point, 52° C.) |  |  |  |  |  |  |  |  |  |  |  |
|  | Sulfur-containing compounds | DMS (boiling point, 248° C.; melting point, 110° C.) |  |  |  |  |  |  |  | 4 |  |  |  |
|  | Cyclic ethers | DOXD (boiling point, 259° C.; melting point, 114° C.) |  |  |  |  |  |  | 4 |  |  |  |  |
| Other low-molecular-weight organic compounds |  | 2P (boiling point, 245° C.; melting point, 25° C.) |  |  |  |  | 4 |  |  |  |  |  |  |
|  |  | DMPA (boiling point, 215° C.; melting point, −49° C.) |  |  |  |  |  | 4 |  |  |  |  |  |
| Specific diols |  | 1,2HD (boiling point, 224° C.; melting point, 2° C.) | 1 | 1 | 1 | 1 | 1 | 1 | 1 | 1 | 1 | 1 | 1 |
|  |  | PG (boiling point, 188° C.; melting point, −59° C.) | 11 | 11 | 12 | 11 | 11 | 11 | 11 | 11 | 5 | 27 | 5 |
|  |  | DPG (boiling point, 232° C.; melting point, −39° C.) |  |  |  |  |  |  |  |  |  |  |  |
| Other diols |  | NPG (boiling point, 208° C.; melting point, 129° C.) |  |  |  |  |  |  |  |  |  |  |  |
| Liquid dispersion of pigment (pigment content on a solids basis) |  | Black pigment (active ingredient, 110 nm) | 4 | 4 | 4 | 4 | 4 | 4 | 4 | 4 | 4 | 4 | 4 |
| Resins (resin content on a solids basis) |  | Resin A (active ingredient, 140 nm) | 6 | 6 | 6 | 6 | 6 | 6 | 6 | 6 | 6 | 6 | 6 |
|  |  | Resin B (active ingredient, 140 nm) |  |  |  |  |  |  |  |  |  |  |  |
|  |  | Resin C (active ingredient, 100 nm) |  |  |  |  |  |  |  |  |  |  |  |
|  |  | Resin D (active ingredient, 180 nm) |  |  |  |  |  |  |  |  |  |  |  |
| Wax |  | Hytec E-6500 (active ingredient) | 0.5 | 0.5 | 0.5 | 0.5 | 0.5 | 0.5 | 0.5 | 0.5 | 0.5 | 0.5 | 0.5 |
| Antifoam |  | Surfynol DF110D | 0.1 | 0.1 | 0.1 | 0.1 | 0.1 | 0.1 | 0.1 | 0.1 | 0.1 | 0.1 | 0.1 |
| Surfactant |  | BYK333 | 0.5 | 0.5 | 0.5 | 0.5 | 0.5 | 0.5 | 0.5 | 0.5 | 0.5 | 0.5 | 0.5 |
| Alkanolamine |  | TIPA (boiling point, 301° C.; melting point, 45° C.) | 1 | 1 | 1 | 1 | 1 | 1 | 1 | 1 | 1 | 1 | 1 |

TABLE 1-continued

|  |  | Ink A | Ink B | Ink C | Ink D | Ink E | Ink F | Ink G | Ink H | Ink I | Ink J | Ink K |
|---|---|---|---|---|---|---|---|---|---|---|---|---|
| Purified water | — | Balance | Balance | Balance | Balance | Balance | Balance | Balance | Balance | Balance | Balance | Balance |
| Total |  | 100 | 100 | 100 | 100 | 100 | 100 | 100 | 100 | 100 | 100 | 100 |
| Particle diameter ratio (B/A) |  | 1.27 | 1.27 | 1.27 | 1.27 | 1.27 | 1.27 | 1.27 | 1.27 | 1.27 | 1.27 | 1.27 |
| Specific diol content |  | 12 | 12 | 13 | 12 | 12 | 12 | 12 | 12 | 6 | 28 | 6 |
| Ratio by mass (specific diol(s)/specific low-molecular-weight organic compound) |  | 3 | 1.5 | 1.18 | 3 | — | — | 3 | 3 | 1.5 | 7 | 0.75 |
| Storage stability |  | A | A | B | A | A | B | B | B | A | A | A |

TABLE 2

|  |  |  | Ink L | Ink M | Ink N | Ink O | Ink P | Ink Q | Ink R | Ink S | Ink T | Ink U | Ink V |
|---|---|---|---|---|---|---|---|---|---|---|---|---|---|
| Specific low-molecular-weight organic compounds | Amides | CPL (boiling point, 267° C.; melting point, 70° C.) | 4 | 4 |  |  | 4 | 4 | 4 | 2 | 4 | 11 |  |
|  |  | 2Pi (boiling point, 256° C.; melting point, 38° C.) |  |  |  |  |  |  |  |  |  |  |  |
|  |  | AA (boiling point, 271° C.; melting point, 52° C.) |  |  |  |  |  |  |  |  |  |  | 4 |
|  | Sulfur-containing compounds | DMS (boiling point, 248° C.; melting point, 110° C.) |  |  |  |  |  |  |  |  |  |  |  |
|  | Cyclic ethers | DOXD (boiling point, 259° C.; melting point, 114° C.) |  |  |  |  |  |  |  |  |  |  |  |
| Other low-molecular-weight organic compounds |  | 2P (boiling point, 245° C.; melting point, 25° C.) |  |  |  |  |  |  |  |  |  |  |  |
|  |  | DMPA (boiling point, 215° C.; melting point, −49° C.) |  |  |  |  |  |  |  |  |  |  |  |
| Specific diols |  | 1,2HD (boiling point, 224° C.; melting point, 2° C.) | 1 | 1 | 1 | 1 | 1 | 1 | 1 | 1 | 1 | 1 | 1 |
|  |  | PG (boiling point, 188° C.; melting point, −59° C.) |  |  | 15 | 11 | 11 | 11 | 11 | 5 | 2 | 21 | 11 |
|  |  | DPG (boiling point, 232° C.; melting point, −39° C.) |  | 11 |  |  |  |  |  |  |  |  |  |
| Other diols |  | NPG (boiling point, 208° C.; melting point, 129° C.) |  | 11 |  | 4 |  |  |  |  |  |  |  |
| Liquid dispersion of pigment (pigment content on a solids basis) |  | Black pigment (active ingredient, 110 nm) | 4 | 4 | 4 | 4 | 4 | 4 | 4 | 4 | 4 | 4 | 4 |

TABLE 2-continued

| | | Ink L | Ink M | Ink N | Ink O | Ink P | Ink Q | Ink R | Ink S | Ink T | Ink U | Ink V |
|---|---|---|---|---|---|---|---|---|---|---|---|---|
| Resins (resin content on a solids basis) | Resin A (active ingredient, 140 nm) | 6 | 6 | 6 | 6 | | | | 6 | 6 | 6 | 6 |
| | Resin B (active ingredient, 140 nm) | | | | | 6 | | | | | | |
| | Resin C (active ingredient, 100 nm) | | | | | | 6 | | | | | |
| | Resin D (active ingredient, 180 nm) | | | | | | | 6 | | | | |
| Wax | Hytec E-6500 (active ingredient) | 0.5 | 0.5 | 0.5 | 0.5 | 0.5 | 0.5 | 0.5 | 0.5 | 0.5 | 0.5 | 0.5 |
| Antifoam | Surfynol DF110D | 0.1 | 0.1 | 0.1 | 0.1 | 0.1 | 0.1 | 0.1 | 0.1 | 0.1 | 0.1 | 0.1 |
| Surfactant | BYK333 | 0.5 | 0.5 | 0.5 | 0.5 | 0.5 | 0.5 | 0.5 | 0.5 | 0.5 | 0.5 | 0.5 |
| Alkanolamine | TIPA (boiling point, 301° C.; melting point, 45° C.) | 1 | 1 | 1 | 1 | 1 | 1 | 1 | 1 | 1 | 1 | 1 |
| Purified water | — | Balance | Balance | Balance | Balance | Balance | Balance | Balance | Balance | Balance | Balance | Balance |
| | Total | 100 | 100 | 100 | 100 | 100 | 100 | 100 | 100 | 100 | 100 | 100 |
| | Particle diameter ratio (B/A) | 1.27 | 1.27 | 1.27 | 1.27 | 1.27 | 0.91 | 1.64 | 1.27 | 1.27 | 1.27 | 1.27 |
| | Specific diol content | 12 | 1 | 16 | 12 | 12 | 12 | 12 | 6 | 3 | 22 | 12 |
| | Ratio by mass (specific diol(s)/specific low-molecular-weight organic compound) | 3 | 0.25 | — | — | 3 | 3 | 3 | 3 | 0.75 | 2 | 3 |
| | Storage stability | A | B | A | A | A | A | A | A | A | B | B |

TABLE 3

| | | | Treatment liquid A | Treatment liquid B | Treatment liquid C | Treatment liquid D |
|---|---|---|---|---|---|---|
| Specific low-molecular-weight organic compounds | Amides | CPL (boiling point, 267° C.; melting point, 70° C.) | 4 | 4 | 4 | |
| Specific diols | | 1,2HD (boiling point, 224° C.; melting point, 2° C.) | 1 | 1 | 1 | 1 |
| | | PG (boiling point, 188° C.; melting point, −59° C.) | 11 | 11 | 11 | 15 |
| Flocculants | Organic acids | Succinic acid (boiling point, 235° C.; melting point, 186° C.) | 0.1 | 0.1 | 4 | 0.1 |
| | Polyvalent metal salts | Calcium propionate | 5 | | | 5 |
| | Cationic resins | Catiomaster PD-7 (active ingredient) | | 3 | | |
| Antifoam | | Surfynol DF110D | 0.1 | 0.1 | 0.1 | 0.1 |
| Surfactant | | BYK333 | 0.5 | 0.5 | 0.5 | 0.5 |
| Purified water | | — | Balance | Balance | Balance | Balance |
| | | Total | 100 | 100 | 100 | 100 |

Terms

"Specific low-molecular-weight organic compound": A water-soluble low-molecular-weight organic compound that has a melting point of 30° C. or above and is any of an amide, sulfur-containing compound, or cyclic ether "Specific diol": An organic solvent that is a diol having a melting point of 25° C. or below "Particle diameter ratio (B/A)": The ratio (B/A) of the volume-average diameter B of particles of the resin to the volume-average diameter A of particles of the black pigment "Boiling point": Refers to the normal boiling point Ingredients Specific Low-Molecular-Weight Organic Compounds
  "CPL": ε-caprolactam
  "2Pi": 2-Piperidone
  "AA": Acetoacetamide
  "DMS": Dimethyl sulfone
  "DOXD": 1,4-Dioxane-2,3-diol
Other Low-Molecular-Weight Organic Compounds
  "2P": 2-Pyrrolidone
  "DMPA": 3-Methoxy-N,N-dimethylpropanamide
Specific Diols
  "1,2HD": 1,2-Hexanediol
  "PG": Propylene glycol
  "DPG": Dipropylene glycol
Other Diols
  "NPG": Neopentyl glycol
Resins
  "Resin A": A resin emulsion; a styrene-acrylic resin; Tg, 90° C.; volume-average diameter of particles, 140 nm
  "Resin B": A resin emulsion; a styrene-acrylic resin; Tg, 70° C.; volume-average diameter of particles, 140 nm
  "Resin C": A resin emulsion; a styrene-acrylic resin; Tg, 90° C.; volume-average diameter of particles, 100 nm
  "Resin D": A resin emulsion; a styrene-acrylic resin; Tg, 90° C.; volume-average diameter of particles, 180 nm
Wax
  "Hytec E-6500": A wax emulsion, a polyethylene wax, the trade name of a Toho Chemical Industry, Co., Ltd. product
Antifoam
  "Surfynol DF110D": An acetylene surfactant, the trade name of a Nissin Chemical Industry Co., Ltd. product
Surfactant
  "BYK333": A silicone surfactant, the trade name of a BYK Japan KK product
Alkanolamine
  "TIPA": Triisopropanolamine, an alkanolamine
Coagulant
  "Catiomaster PD-7": An amine-epichlorohydrin copolymer, the trade name of a Yokkaichi Chemical Co., Ltd. product 3.3 Recording Conditions The recording conditions in the evaluation tests were as follows.

Recording Conditions
Printer: "SC-R5050," the trade name of a Seiko Epson Corporation product, a modified version
Resolution: 1200×1200 dpi
Loadings: Ink jet ink composition, 12 mg/inch$^2$; treatment liquid (when used), 1 mg/inch$^2$
Pattern printed: A solid pattern (in the single color of black)
Number of passes: The number in Table 4 below
Medium surface temperature: The temperature in Table 4 below (25° C. means the heater was off)
On-medium air velocity: The velocity of air immediately above the recording medium near the head. The value in Table 4.
Main scan time: The length of time for a point of the head to move from one end of the recording medium to the other in a main scan.
Surface temperature of the recording medium in the postheating step: 80° C. Postheating was carried out with a heater for the postheating step placed downstream in the direction of transport of the recording medium.
Recording medium: "Orajet 3165G-010," the trade name of an ORAFOL Japan product, a PVC film
Platen gap: 1.7 mm In the above printing conditions, the medium surface temperature is the surface temperature of the recording medium in the first heating step. The first heating was performed using a platen heater. A fan placed above the head, furthermore, was used to send air to near the surface of the recording medium. The temperature of the air was 25° C.

The medium surface temperature of 25° C. in some examples, furthermore, indicates the surface temperature of the recording medium in an ink attachment step performed with the heater off, i.e., without heating the recording medium.

In Table 4 below, the "number of passes" represents how many main scans were made in the same main scan area.

The upstream row of nozzles, upstream in the direction of transport of the recording medium, of the head of the recording apparatus specified above were loaded with the treatment liquid, and the downstream row of nozzles was loaded with the ink liquid. Under these recording conditions, recording jobs were performed.

TABLE 4

| | Example 1 | Example 2 | Example 3 | Example 4 | Example 5 | Example 6 | Example 7 |
|---|---|---|---|---|---|---|---|
| Color ink | Ink A | Ink B | Ink D | Ink G | Ink H | Ink I | Ink J |
| Treatment liquid | — | — | — | — | — | — | — |
| Medium surface temperature | 40° C. | 40° C. | 40° C. | 40° C. | 40° C. | 40° C. | 40° C. |
| On-medium air velocity | 3 m/s | 3 m/s | 3 m/s | 3 m/s | 3 m/s | 3 m/s | 3 m/s |
| Number of passes | 8 | 8 | 8 | 8 | 8 | 8 | 8 |
| Main scan time | 2.5 s | 2.5 s | 2.5 s | 2.5 s | 2.5 s | 2.5 s | 2.5 s |
| Image quality (coalescence) | A | A | B | A | A | A | A |
| Deviation | A | B | AA | B | B | B | AA |
| Abrasion resistance | AA | A | AA | AA | AA | AA | B |
| Recovery from clogging | A | A | A | B | B | B | AA |
| Water condensation at the head | B | B | B | B | B | B | B |
| Image quality (irregularities in gloss) | B | A | B | B | B | B | B |

TABLE 4-continued

| | Example 8 | Example 9 | Example 10 | Example 11 | Example 12 | Example 13 | Example 14 |
|---|---|---|---|---|---|---|---|
| Color ink | Ink L | Ink P | Ink Q | Ink R | Ink S | Ink V | Ink A |
| Treatment liquid | — | — | — | — | — | — | — |
| Medium surface temperature | 40° C. | 40° C. | 40° C. | 40° C. | 40° C. | 40° C. | 35° C. |
| On-medium air velocity | 3 m/s | 3 m/s | 3 m/s | 3 m/s | 3 m/s | 3 m/s | 3 m/s |
| Number of passes | 8 | 8 | 8 | 8 | 8 | 8 | 8 |
| Main scan time | 2.5 s | 2.5 s | 2.5 s | 2.5 s | 2.5 s | 2.5 s | 2.5 s |
| Image quality (coalescence) | A | A | A | A | B | A | B |
| Deviation | A | A | A | A | AA | A | AA |
| Abrasion resistance | B | A | AA | A | A | A | AA |
| Recovery from clogging | AA | A | B | AA | AA | A | AA |
| Water condensation at the head | B | B | B | B | B | B | A |
| Image quality (irregularities in gloss) | B | B | A | B | C | B | A |

| | Example 15 | Example 16 | Example 17 | Example 18 | Example 19 | Example 20 | Example 21 |
|---|---|---|---|---|---|---|---|
| Color ink | Ink A | Ink A | Ink A | Ink A | Ink A | Ink A | Ink A |
| Treatment liquid | — | Treatment liquid A | Treatment liquid A | Treatment liquid B | Treatment liquid C | Treatment liquid D | — |
| Medium surface temperature | 45° C. | 35° C. | 25° C. | 25°C | 25°C | 25° C. | 40° C. |
| On-medium air velocity | 3 m/s | 3 m/s | 3 m/s | 3m/s | 3m/s | 3 m/s | 3 m/s |
| Number of passes | 8 | 8 | 8 | 8 | 8 | 8 | 8 |
| Main scan time | 2.5 s | 2.5 s | 2.5 s | 2.5 s | 2.5 s | 2.5 s | 1.5 s |
| Image quality (coalescence) | AA | AA | A | A | B | AA | A |
| Deviation | B | AA | AA | AA | AA | AA | A |
| Abrasion resistance | AA | A | A | A | A | B | AA |
| Recovery from clogging | B | AA | AA | AA | AA | AA | A |
| Water condensation at the head | C | A | AA | AA | AA | A | A |
| Image quality (irregularities in gloss) | C | A | AA | AA | AA | A | B |

| | Example 22 | Example 23 | Example 24 | Comparative Example 1 | Comparative Example 2 | Comparative Example 3 | Comparative Example 4 |
|---|---|---|---|---|---|---|---|
| Color ink | Ink A | Ink A | Ink A | Ink C | Ink E | Ink F | Ink K |
| Treatment liquid | — | — | — | — | — | — | — |
| Medium surface temperature | 40° C. | 40° C. | 40° C. | 40° C. | 40° C. | 40° C. | 40° C. |
| On-medium air velocity | 2 m/s | 3 m/s | 3 m/s | 3 m/s | 3 m/s | 3 m/s | 3 m/s |
| Number of passes | 8 | 4 | 10 | 8 | 8 | 8 | 8 |
| Main scan time | 2.5 s | 2.5 s | 2.5 s | 2.5 s | 2.5 s | 2.5 s | 2.5 s |
| Image quality (coalescence) | B | B | AA | A | C | C | A |
| Deviation | A | A | A | C | AA | AA | C |
| Abrasion resistance | AA | AA | AA | A | AA | AA | A |
| Recovery from clogging | A | A | A | A | A | A | C |
| Water condensation at the head | A | C | A | B | B | B | B |
| Image quality (irregularities in gloss) | B | C | A | B | C | C | B |

| | Comparative Example 5 | Comparative Example 6 | Comparative Example 7 | Comparative Example 8 | Comparative Example 9 |
|---|---|---|---|---|---|
| Color ink | Ink M | Ink N | Ink O | Ink T | Ink U |
| Treatment liquid | — | — | — | — | — |
| Medium surface temperature | 40° C. | 40° C. | 40° C. | 40° C. | 40° C. |
| On-medium air velocity | 3 m/s | 3 m/s | 3 m/s | 3 m/s | 3 m/s |
| Number of passes | 8 | 8 | 8 | 8 | 8 |
| Main scan time | 2.5 s | 2.5 s | 2.5 s | 2.5 s | 2.5 s |
| Image quality (coalescence) | AA | C | A | AA | A |
| Deviation | C | AA | A | C | C |
| Abrasion resistance | B | C | C | B | C |
| Recovery from clogging | C | A | A | C | A |
| Water condensation at the head | B | B | B | B | B |
| Image quality (irregularities in gloss) | B | C | C | B | B |

3.4 Test Methods

The inks and recording methods were tested for storage stability, image quality (gloss-banding irregularities), image quality (coalescence), deviation, recovery from clogging, water condensation at the head, and drying (abrasion resistance). The test methods were as follows.

3.4.1 Storage Stability

Thirty grams of the color ink used in the example or comparative example was sealed in an aluminum pack without allowing air into it, and this aluminum pack was left in a temperature-controlled chamber at 60° C. for 6 days. After the pack was removed and allowed to cool, the viscosity of the ink at a shear rate of 200 s$^{-1}$ was measured using a rheometer (MCR702, Anton Paar). The percentage increase in viscosity was calculated by comparing the measured viscosity with the initial viscosity (of the freshly prepared ink), and storage stability was graded according to the criteria below.

Grading Criteria
  A: The percentage increase in viscosity is less than 3%
  B: The percentage increase in viscosity is 3% or more and less than 5%
  C: The percentage increase in viscosity is 5% or more (unacceptable)

3.4.2 Image Quality (gloss-banding irregularities)

A solid pattern was printed according to Table 4 under the above recording conditions. The printed article was visually inspected, and its quality was graded according to the criteria below.

Grading Criteria
- AA: No visible band-shaped irregularities in gloss, i.e., bands with varying degrees of gloss running in the main scan direction (gloss banding)
- A: Gloss banding is observed but not to a noticeable extent
- B: Gloss banding is conspicuous but acceptable
- C: Gloss banding is conspicuous 3.4.3 Image Quality (Coalescence)

Under the above recording conditions, a solid pattern was printed according to Table 4. The printed article was visually inspected, and its quality was graded according to the criteria below.

Grading Criteria
- AA: No coalescence is observed
- A: Coalescence is observed but not to a noticeable extent
- B: Coalescence is conspicuous but acceptable
- C: Coalescence is conspicuous 3.4.4 Deviation Under the above recording conditions, the recording apparatus was prepared according to Table 4. First, a nozzle check pattern was recorded immediately after flushing. The head was run idle, ejecting no ink, under the printing conditions in Table 4 above for 1 minute, and, after the idle run, the same nozzle check pattern was recorded. In the recording of the nozzle check pattern, the ink ejection was timed so that when without deviation, droplets would land on the same points before and after the idle run. The average of all nozzles was reported. Any nozzle that failed to eject the ink, however, was excluded. Deviation was graded according to the criteria below.

Grading Criteria
- AA: No difference in landing points between before and after the idle run
- A: A deviation equal to or shorter than half the nozzle spacing
- B: A deviation equal to or shorter than the nozzle spacing
- C: A deviation exceeding the nozzle spacing 3.4.5 Recovery from Clogging Under the above recording conditions, the recording apparatus was prepared according to Table 4. The nozzles of the head were disabled for ejection intentionally. In this state, the head was run idle under the printing conditions in Table 4 above for 2 hours. After the recording job, the head was cleaned three times, the final number of missing nozzles was determined, and recovery from clogging was graded according to the criteria below. In each time of cleaning 0.5 g of the ink was drained from the row of nozzles. The disabled nozzles were rendered so by patting the nozzle side of the head with a water-dampened Bemcot wiper. The row of nozzles consists of 400 nozzles.

Grading Criteria
- AA: No nozzle fails to eject the ink
- A: Less than 3% of the nozzles fail to eject the ink
- B: 3% or more and less than 5% of the nozzles fail to eject the ink
- C: 5% or more of the nozzles fail to eject the ink 3.4.6 Water Condensation at the Head Under the above recording conditions, a solid pattern was printed according to Table 4 continuously for 2 and 4 hours. Then the head was checked for water condensation and non-ejecting nozzles. The print job was performed in a temperature- and humidity-controlled room at 25° C. and 20%. After the print job, the nozzle side of the printhead was inspected for water condensation and non-ejecting nozzles, and water condensation at the head was graded according to the criteria below.

Grading Criteria
- AA: No water condensation on the nozzle side even after 4 hours of printing
- A: Water condenses on the nozzle size in 4 hours of printing, but all nozzles eject the ink
- B: Water condenses on the nozzle size in 4 hours of printing, and some nozzles fail to eject the ink
- C: Water condenses on the nozzle size in 2 hours of printing, and some nozzles fail to eject the ink 3.4.7 Drying (Abrasion Resistance)

Under the above recording conditions, a solid pattern was recorded on the recording medium according to Table 4. The recorded article was left at room temperature for 30 minutes, the area with the printed solid pattern was cut into a 30X150-mm rectangle, and the cut specimen was rubbed 100 times with a piece of plain-woven fabric using a color fastness rubbing tester (load, 500 g). The rubbed specimen was visually inspected for ink peeling, and abrasion resistance was graded according to the following criteria.

Grading Criteria
- AA: No peeling
- A: The ink peeled in less than 20% of the test area
- B: The ink peeled in less than 50% of the test area
- C: The ink peeled in 50% or more of the test area 3.5 Test Results The test results are presented in Tables 1, 2, and 4 above.

As can be seen by comparing the examples and the comparative examples, the examples, each being a combination of an ink jet ink composition and a recording method according to embodiments of the present disclosure, all help achieve high abrasion resistance, good image quality (reduction of coalescence), and great reduction of deviation.

By contrast, the comparative examples, each not being a combination of an ink and a recording method according to embodiments of the present disclosure, were all inferior in any of abrasion resistance, image quality (reduction of coalescence), or the reduction of deviation.

When Example 1 is compared with Comparative Examples 1 to 9, it shows that by adding a specific low-molecular-weight organic compound to a percentage equal to or lower than a particular limit and making a specific diol more abundant than the specific low-molecular-weight organic compound, great reduction of deviation can be achieved along with good image quality (coalescence) and abrasion resistance.

The results for Examples 1, 3 to 5, and 13 indicate the specific low-molecular-weight organic compound can be any of an amide, sulfur-containing compound, or cyclic ether for good image quality (coalescence) and great reduction of deviation to be achieved.

The results for Examples 1, 2, 6, and 7 indicate the ratio by mass (A/B) between the quantity A of the specific diol and the quantity B of the specific low-molecular-weight organic compound can be in a predetermined wide range for deviation, abrasion resistance, recovery from clogging, etc., to be good.

The results for Examples 1 and 8 indicate any combination of specific diols delivers great reduction of deviation.

The results for Examples 9 to 11 indicate great reduction of deviation can be achieved along with high abrasion resistance and good image quality (coalescence) with a wide variety of resins.

The results for Examples 1, 14, and 15 indicate image quality (coalescence) remains good enough even when the surface temperature of the recording medium to which the ink is attached is relatively low.

The results for Examples 14 and 16 to 20 indicate good image quality (coalescence) is achieved even without a treatment liquid.

The results for Examples 1, 21, and 22 indicate great reduction of deviation can be achieved along with high abrasion resistance and good image quality (coalescence) even after changes to parameters such as the main scan time and on-medium air velocity.

The results for Examples 1, 23, and 24 indicate image quality (coalescence) remains good enough even when the number of passes is relatively small.

From the embodiments described above, the following is derived.

A form of an ink jet ink composition is:
a water-based ink that:
contains at least one pigment and at least one resin; and
is for use in recording on a low- or non-absorbent recording medium, wherein:
the ink composition contains at least one water-soluble low-molecular-weight organic compound that has a melting point of 30° C. or above and is any of an amide, sulfur-containing compound, or cyclic ether, the low-molecular-weight organic compound constituting 10% by mass or less of the total mass of the ink composition; and
the ink composition contains at least one organic solvent that is a diol having a melting point of 25° C. or below, the organic solvent being more abundant than the low-molecular-weight organic compound.

In the above form of an ink jet ink composition,
the ratio by mass (A/B) between the quantity A of the organic solvent that is a diol having a melting point of 25° C. or below and the quantity B of the low-molecular-weight organic compound may be from 1.3 to 10.

In any of the above forms of an ink jet ink composition, the organic solvent that is a diol having a melting point of 25° C. or below may constitute 5% to 30% by mass of the total mass of the ink composition.

In any of the above forms of an ink jet ink composition, the organic solvent that is a diol having a melting point of 25° C. or below may include an organic solvent having a normal boiling point of 170° C. to 250° C.

In any of the above forms of an ink jet ink composition, the low-molecular-weight organic compound may have a normal boiling point of 280° C. or below.

In any of the above forms of an ink jet ink composition, the resin may include resin particles.

In any of the above forms of an ink jet ink composition, the resin particles may have a glass transition point of 50° C. to 110° C. and a volume-average diameter of 90 to 220 nm.

In any of the above forms of an ink jet ink composition, the resin may be the resin particles, and the ratio (B/A) of the volume-average diameter B of the resin particles to the volume-average diameter A of particles of the pigment may be from 0.6 to 1.8.

A form of a recording method includes:
ejecting an ink jet ink composition in any of the above forms from an ink jet head and attaching it to a recording medium, wherein:
the recording medium is a low- or non-absorbent recording medium.

In the above form of a recording method,
when the ink jet ink composition is attached to the recording medium, the recording medium may have a surface temperature of 45° C. or below.

Any of the above forms of a recording method may further include:
a first heating step, in which the ink jet ink composition attached to the recording medium is heated.

Any of the above forms of a recording method may further include:
attaching a flocculant-containing treatment liquid to the recording medium.

In any of the above forms of a recording method,
the treatment liquid may contain a water-soluble low-molecular-weight organic compound that has a melting point of 30° C. or above and is any of an amide, sulfur-containing compound, or cyclic ether and may also contain an organic solvent that is a diol having a melting point of 25° C. or below.

In any of the above forms of a recording method,
a main scan may be repeated in which the relative positions of the recording medium and the ink jet head are changed while the ink jet ink composition is ejected from the ink jet head, and ten or fewer main scans may be made in the same main scan area.

The present disclosure is not limited to the above embodiments, and many variations are possible. For example, the present disclosure embraces configurations substantially identical to those described in the embodiments, such as configurations identical in function, methodology, and results to or having the same goal and offering the same advantages as the described ones. The present disclosure also includes configurations created by changing any non-essential part of those described in the above embodiments. Furthermore, the present disclosure encompasses configurations identical in operation and effect to or capable of fulfilling the same purposes as those described in the above embodiments. Configurations obtained by adding any known technology to those described in the embodiments are also part of the present disclosure.

What is claimed is:

1. An ink jet ink composition comprising:
a water-based ink that:
contains at least one pigment and at least one resin; and
is for use in recording on a low- or non-absorbent recording medium, wherein:
the ink composition contains at least one water-soluble low-molecular-weight organic compound that has a melting point of 30° C. or above and is any of an amide, sulfur-containing compound, or cyclic ether, the low-molecular-weight organic compound constituting 10% by mass or less of a total mass of the ink composition; and
the ink composition contains at least one organic solvent that is a diol having a melting point of 25° C. or below, the organic solvent being more abundant than the low-molecular-weight organic compound.

2. The ink jet ink composition according to claim 1, wherein:
a ratio by mass A/B between a quantity A of the organic solvent that is a diol having a melting point of 25° C. or below and a quantity B of the low-molecular-weight organic compound is from 1.3 to 10.

3. The ink jet ink composition according to claim 1, wherein:
the organic solvent that is a diol having a melting point of 25° C. or below constitutes 5% to 30% by mass of the total mass of the ink composition.

4. The ink jet ink composition according to claim 1, wherein:
the organic solvent that is a diol having a melting point of 25° C. or below includes an organic solvent having a normal boiling point of 170° C. to 250° C.

5. The ink jet ink composition according to claim 1, wherein:
the low-molecular-weight organic compound has a normal boiling point of 280° C. or below.

6. The ink jet ink composition according to claim 1, wherein:
the resin includes resin particles.

7. The ink jet ink composition according to claim 6, wherein:
the resin particles have a glass transition point of 50° C. to 110° C. and a volume-average diameter of 90 to 220 nm.

8. The ink jet ink composition according to claim 6, wherein:
the resin is the resin particles, and a ratio B/A of a volume-average diameter B of the resin particles to a volume-average diameter A of particles of the pigment is from 0.6 to 1.8.

9. A recording method comprising:
ejecting the ink jet ink composition according to claim 1 from an ink jet head and attaching the ink jet ink composition to a recording medium, wherein:
the recording medium is a low- or non-absorbent recording medium.

10. The recording method according to claim 9, wherein:
when the ink jet ink composition is attached to the recording medium, the recording medium has a surface temperature of 45° C. or below.

11. The recording method according to claim 9, the method further comprising:
a first heating step, in which the ink jet ink composition attached to the recording medium is heated.

12. The recording method according to claim 9, the method further comprising:
attaching a flocculant-containing treatment liquid to the recording medium.

13. The recording method according to claim 12, wherein:
the treatment liquid contains a water-soluble low-molecular-weight organic compound that has a melting point of 30° C. or above and is any of an amide, sulfur-containing compound, or cyclic ether and also contains an organic solvent that is a diol having a melting point of 25° C. or below.

14. The recording method according to claim 9, wherein:
a main scan is repeated in which relative positions of the recording medium and the ink jet head are changed while the ink jet ink composition is ejected from the ink jet head, and ten or fewer main scans are made in the same main scan area.

* * * * *